(12) United States Patent
Ishizaki et al.

(10) Patent No.: US 8,296,747 B2
(45) Date of Patent: Oct. 23, 2012

(54) METHOD FOR OPTIMIZING CHARACTER STRING OUTPUT PROCESSING

(75) Inventors: Kazuaki Ishizaki, Tokyo (JP); Goh Kondoh, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 1355 days.

(21) Appl. No.: 11/776,640

(22) Filed: Jul. 12, 2007

(65) Prior Publication Data
US 2008/0059875 A1    Mar. 6, 2008

(30) Foreign Application Priority Data
Aug. 31, 2006    (JP) .................................. 2006-235420

(51) Int. Cl.
*G06F 9/45*    (2006.01)
(52) U.S. Cl. ......... 717/151; 717/140; 717/152; 717/153
(58) Field of Classification Search ........................ None
See application file for complete search history.

(56) References Cited

U.S. PATENT DOCUMENTS

| | | | | |
|---|---|---|---|---|
| 5,696,973 A * | 12/1997 | Agrawal et al. | ............... | 717/152 |
| 7,080,367 B2 * | 7/2006 | Takayama et al. | ............. | 717/151 |
| 7,444,626 B2 * | 10/2008 | McIntosh et al. | .............. | 717/151 |
| 7,526,760 B1 * | 4/2009 | Daynes et al. | ................. | 717/153 |
| 7,689,979 B1 * | 3/2010 | Sawyer et al. | ................. | 717/152 |
| 7,730,470 B2 * | 6/2010 | Sharapov et al. | ............. | 717/151 |
| 7,797,690 B2 * | 9/2010 | Nesbitt et al. | ................. | 717/153 |
| 7,921,418 B2 * | 4/2011 | Nair et al. | ...................... | 717/151 |
| 8,156,481 B1 * | 4/2012 | Koh et al. | ...................... | 717/151 |
| 2002/0170043 A1 * | 11/2002 | Bagley et al. | ................. | 717/153 |
| 2003/0023961 A1 * | 1/2003 | Barsness et al. | .............. | 717/152 |
| 2003/0145312 A1 * | 7/2003 | Bates et al. | .................... | 717/152 |
| 2004/0083468 A1 * | 4/2004 | Ogawa et al. | ................. | 717/151 |
| 2004/0088685 A1 * | 5/2004 | Poznanovic et al. | .......... | 717/140 |

(Continued)

FOREIGN PATENT DOCUMENTS
JP    2005-332146    2/2005

OTHER PUBLICATIONS

Rogerio G. de Almeida and Edgardo D. Castronuovo; Optimum Generation Control in Wind Parks When Carrying Out System Operator Requests; 2006; pp. 1-8; [retrieved online on Jun. 8, 2012]. Retrieved from Internet: <URL: http://www.science.smith.edu/~jcardell/Readings/Wind/Almeide%20-%20opt%20cntl.pdf>.*
Benjamin Vitale and Tarek S. Abdelrahman; Catenation and Specialization for Tcl Virtual Machine Performance; Jun. 7, 2004; pp. 1-9; [retrieved online on Jum 8, 2012]. Retrieved from Internet: <URL: http://delivery.acm.org/10.1145/1060000/1059591/p42-vitale.pdf>.*

(Continued)

*Primary Examiner* — Thuy Dao
*Assistant Examiner* — Hanh T Bui
(74) *Attorney, Agent, or Firm* — Hoffman Warnick LLC

(57) ABSTRACT

A system acquires an output program for sequentially executing a plurality of character string output instructions, and thereby for outputting a text in which a plurality of output character strings are combined. The system converts the character code set of the character string constants, which is outputted by at least one of the character string output instructions, from a first code set for internal processing to a second code set for output, before the output program is executed. In addition, the system buffers the values of two or more character string variables to be outputted by two or more of the character string output instructions without converting the character code set from the first code set, during the execution of the output program.

16 Claims, 23 Drawing Sheets

U.S. PATENT DOCUMENTS

| | | | |
|---|---|---|---|
| 2005/0071831 A1* | 3/2005 | Sheikh et al. | 717/151 |
| 2005/0155024 A1* | 7/2005 | Wannamaker et al. | 717/151 |
| 2005/0160407 A1* | 7/2005 | Takamura et al. | 717/134 |
| 2005/0268293 A1* | 12/2005 | Kawahito et al. | 717/154 |
| 2006/0041872 A1* | 2/2006 | Poznanovic et al. | 717/140 |
| 2007/0245323 A1* | 10/2007 | Bertelrud | 717/140 |
| 2007/0266379 A1* | 11/2007 | Asao | 717/140 |
| 2009/0019432 A1* | 1/2009 | Kondo | 717/153 |
| 2009/0106744 A1* | 4/2009 | Li et al. | 717/151 |
| 2011/0314459 A1* | 12/2011 | Husbands | 717/151 |

OTHER PUBLICATIONS

Song-Yul Choe et al.; Dynamic Simulator for a PEM Fuel Cell System With a PWM DC/DC Converter; 2007; pp. 1-12; [retrieved online on Jun. 8, 2012]. Retrieved from Internet: <URL: http://ieeexplore.ieee.org/stamp/stamp.jsp?tp=&arnumber=4505385>.*

"Class FastWriter", 6 pages, pulled on Apr. 26, 2007 from http://www.webmacro.org/api/org/webmacro/FastWriter.html.

* cited by examiner

```
1: <ol>              ← 200
2: <% for (int i = 0; i < 100; i++) { / %>
3: <li> <%=generation of dynamic text in accordance with business logic of backend(i)%>
4: <% } %>
5: </ol>   ─ 230
```

FIG. 2a

```
1: public void doService(···) {
2:   JSPWriter out = ···
3:   out. write( "<ol>" ) ;
4:   for (int i = 0; i < 100; i++) {
5:     out. write( "<li>" );
6:     out. write(dynamic text);
7:   }
8:   out. write( "</ol>" );
9: }
```

FIG. 2b

```
1: byte template_text_array1[] =  "<ol>" .getBytes() ;
2: byte template_text_array2[] =  "<li>" .getBytes() ;
3: byte template_text_array3[] =  "</ol>" .getBytes() ;
4:
5: public void doService(···)  {
6:     JSPWriter out = ···
7:     out. write(template_text_array1) ;
8:     for (int i =0; i < 100; i++)  {
9:         out. write(template_text_array2) ;
10:        out. write(dynamic text) ;
11:    }
12:    out. write(template_text_array3) ;
13: }
```

```
 1: byte template_text_array1[] =  "<ol>" .getBytes() ;
 2: byte template_text_array2[] =  "<li>" .TOChaArray() ;
 3: byte template_text_array3[] =  "</ol>" .getBytes() ;
 4:
 5: public void doService(···)  {
 6:    JSPWriter out = ···
 7:    out. write(template_text_array1) ;
 8:    for (int i =0; i < 100; i++)  {
 9:        out. write(template_text_array2) ;
10:        out. write(dynamic text) ;
11:    }
12:    out. write(template_text_array3) ;
13: }
```

FIG. 6a

```
1: public void write(char str[])  {
2:   System.arraycopy(str. 0.  charBuffer. cb_index. str. length) ;
3:   cb_index += str. length;
4: }
5: public void write(byte array[])  {
6:    flushCB() ;
7:     writeBB(array) ;
8: }
9: public void writeBB(byte array[])  {
10:   System.arrayopy(array. 0. byteBuffer. bb_index. array. length) ;
11:   bb_index += array. length;
12: }
13: public void flushCB() {
14:    if (cb_index > 0) { // when charBuffer is not empty
15:      /*encode character strings from 0 of charBuffer to cb_index and store the result in
16:       bb_index of byteBuffer. And store the number of bytes of the encoding result in len*/
17:     int blen = encode(charBuffer, 0, cb_imdex, byteBuffer, bb_index) ;
18:     bb_index += blen
19:     cb_index = 0
20:    }
21: }
22:   /*output stream for writing in reality*/
23:   private OutputStream os ;
24:   public void flush() {
25:      flushCB()
26:      os. write(byteBuffer, 0, bb_index) ;
27:      bb_index = 0;
28: }
```

FIG. 6b

```
1:    <ol>
2:    <li> O× CORPORATION              ¥552
3:    <li> ×× CONSTRUCTION Co., LTD.   ¥660
4:    <li> OO  MOTORS                  ¥350
               .
               .
               .
X:    <li>AVERAGE STOCK PRICE          ¥1235
X-1:  </ol>
```

| INSTRUCTIONS | CORRESPONDING PARTS OF JSP | SPECIFIC EXAMPLES |
|---|---|---|
| CHARACTER STRING OUTPUT INSTRUCTION FOR OUTPUTTING CHARACTER STRING CONSTANT (TT INSTRUCTION) | TAG AND TEXT WRITTEN IN HTML, AND CONTENTS OF <jsp:text> TAG | <title>ABC</title><br><jsp:text>Hello,World</jsp:text> |
| CHARACTER STRING OUTPUT INSTRUCTION FOR OUTPUTTING VALUE OF CHARACTER STRING VARIABLE (DT INSTRUCTION) | OUTPUT TO out OBJECT IN EXPRESSION AND scriptlet | <%= · · · %><br><% out.printin(· · ·); %> |
| CALL FUNCTION WHICH CAN OUTPUT CHARACTER STRING | CALL OF USER-DEFINED FUNCTION/ TAG LIBRARY REACHABLE TO out OBJECT, pageContext OBJECT, OR response OBJECT | <%!<br>My_function(PageContext ctx) {<br>· · ·<br>}<br>%><br><c:for · · ·><br><i18n:message · · ·><br><% my_function(pageContext) ; %> |
| FIRST BUFFERING INSTRUCTION | JSPWriter#write(char[]) | |
| SECOND BUFFERING INSTRUCTION | JSPWriter#write(byte[]) | |

FIG. 22

```
1:  function write_c($s) {
2:      write_b(mb_convert_encoding($s, $output_encoding)) ;
3:  }
4:  function write_b($s) {
5:      $byteBuffer .= $s;  // .= MEANS TO ADD RIGHT-HAND EXPRESSION
                                        AT END POINT OF LEFT-HAND EXPRESSION
6:  }
```

FIG. 23

```
1:  function write_c($s) {
2:      $charBuffer .= $s;  // .= MEANS TO ADD RIGHT-HAND EXPRESSION AT
                                        END POINT OF LEFT-HAND EXPRESSION
3:  }
4:  function write_b($s) {
5:      flushCB() ;
6:      writeBB($s) ;
7:  }
8:  function writeBB($s) {
9:      $byteBuffer .= $s,  // .= MEANS TO ADD RIGHT-HAND EXPRESSION AT
                                        END POINT OF LEFT-HAND EXPRESSION
10: }
11: function flushCB() {
12:     if (mb_strlen(#charBuffer) > 0) {  // when charBuffer is not empty
13:         writeBB(mb_convert_encoding($charBuffer, $output_encoding)) ;
14:         charBuffer = "" ;
15:     }
16: }
```

FIG. 24

| INSTRUCTIONS | CORRESPONDING PARTS OF JSP | SPECIFIC EXAMPLES |
|---|---|---|
| CHARACTER STRING OUTPUT INSTRUCTION FOR OUTPUTTING CHARACTER STRING CONSTANT (TT INSTRUCTION) | CONSTANTS PASSED AS HTML BLOCK (TAG AND TEXT WRITTEN IN HTML), OR ARGUMENT OF echo STATEMENT, OR OF print EXPRESSION | <title>ABC</title><br><?php echo 'Hello.World' ; ?> |
| CHARACTER STRING OUTPUT INSTRUCTION FOR OUTPUTTING VALUE OF CHARACTER STRING VARIABLE (DT INSTRUCTION) | VARIABLE PASSED AS ARGUMENT TO Echo STATEMENT AND print EXPRESSION | <?php echo '$user' ; ?> |
| CALL FUNCTION WHICH CAN OUTPUT CHARACTER STRING | CALL OF ALL FUNCTIONS | <?php<br>function My_function() {<br>...<br>}<br>?><br><?php my_function() ; ?> |
| SECOND BUFFERING INSTRUCTION | ZEND_ECHO_WITHOUT_ENC INSTRUCTION (CALL write_b($s)) | |
| FIRST BUFFERING INSTRUCTION | ZEND_ECHO_WITH_ENC INSTRUCTION (CALL write_c($s)) | |

FIG. 25

| KINDS OF CONTROL | SOURCE CODES | CONTROL FLOW GRAPHS |
|---|---|---|
| IF STATEMENT | if(CONDITION)<br>  STATEMENT | (CONDITION → STATEMENT) |
| Else STATEMENT | if(CONDITION)<br>  STATEMENT 1<br>else<br>  STATEMENT 2 | (CONDITION → STATEMENT 1 / STATEMENT 2) |
| Elseif STATEMENT | COMBINATION OF Else STATEMENT and if STATEMENTS | |
| While STATEMENT | While (CONDITION)<br>  STATEMENT; | (CONDITION → STATEMENT, loop) |
| Do-while STATEMENT | Do {<br>    STATEMENT<br>  }while (CONDITION); | (STATEMENT → CONDITION, loop) |
| For STATEMENT | For (EXPRESSION 1;<br>   EXPRESSION 2;<br>   EXPRESSION 3)<br>  STATEMENT | (EXPRESSION 1 → EXPRESSION 2 → STATEMENT → EXPRESSION 3, loop) |

FIG. 26a

| KINDS OF CONTROL | SOURCE CODES | CONTROL FLOW GRAPHS |
|---|---|---|
| Foreach STATEMENT | foreach(array as $value) STATEMENT OR foreach(array as $key => $value) STATEMENT | 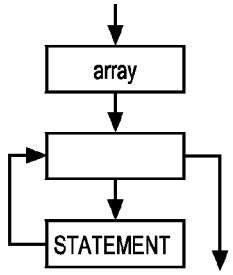 |
| Break STATEMENT | GENERATE EDGES AT END POINTS OF for, foreach, while, do-while and switch STATEMENTS WHICH ENCIRCLE. WHEN THERE ARE ARGUMENTS OF OPTIONS, GENERATE EDGES FOR AMOUNT OF THE NUMBER AT END POINT OF LOOP AND switch STATEMENTS WHICH ENCIRCLE IN THE OUTER SIDE | |
| Continue STATEMENT | GENERATE EDGE TO DESTINATION OF BACK EDGE IN LOOP STRUCTURE, AND WHEN THERE ARE ARGUMENTS OF OPTIONS, CREATE BACK EDGES TO OUTER LOOP FOR AMOUNT OF THE NUMBER. | |
| Switch STATEMENT | Switch (EXPRESSION) { Case CONSTANT 1: STATEMENT 1 ... Case CONSTANT n: STATEMENT n default STATEMENT n+1 } | 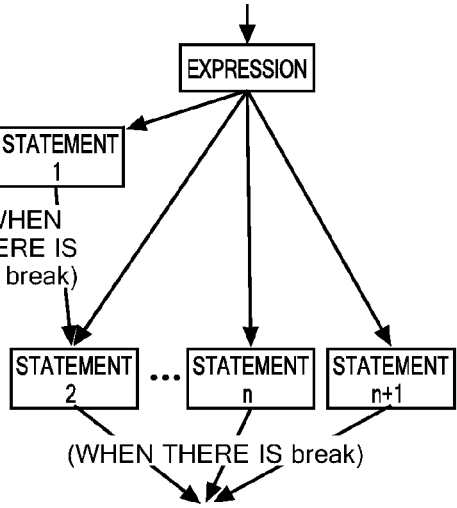 |
| Return STATEMENT | CREATE EDGE TO EXIT OF FUNCTION | |

FIG. 26b

METHOD FOR OPTIMIZING CHARACTER STRING OUTPUT PROCESSING

BACKGROUND OF THE INVENTION

The present invention relates to a method for optimizing character string processing. The present invention particularly relates to a method for optimizing executions of a plurality of character string output instructions included in a program.

Java Server Pages (JSP) and Hypertext Processor (PHP) are techniques for dynamically generating a character string to be displayed on a web page. In such techniques, a program for displaying a character string is previously created, and is embedded in a web server. In response to each request from a web-page audience, the program is executed, and thereby a web page responding to the request of the audience is dynamically generated and displayed each time. The main internal operation is processing where an installed program is converted into a program in Java language or the like, and where the converted program is then compiled to be executed (Java and all Java-based trademarks are trademarks of Sun Microsystems, Inc. in the United States, other countries, or both).

A character code set of characters used in a Java language processing system is sometimes different from a character code set of characters to be displayed on a web page. For example, in the case of Java, a character code set of characters stored in a character string variable is Unicode. Unicode is different from Shift JIS that is generally used for a web page. For this reason, in a Java program, after performing a string operation in Unicode, it is necessary to convert a character string from the Unicode character code set to the Shift JIS character code set when outputting the character string. If such conversion processing between character code sets is frequently performed, the efficiency in processing may be reduced.

For the purpose of dealing with the above-described problem, proposed are techniques for improving efficiency in conversion processing between character code sets (refer to Japanese Patent Application Laid-open Publication No. 2005-332146 and Products top page, WebMacro, Website URL: "HTTP://www.webmacro.org/" (hereinafter, referred to as WebMacro). In the technique of WebMacro, a character string before a conversion and a character string after the conversion are cached in association with each other. Thereafter, next time the same character string is converted, the content in the cache is outputted by bypassing the conversion processing. On the other hand, in the technique of Japanese Patent Application Laid-open Publication No. 2005-332146, in the case of a character string output instruction for outputting a character string constant, a character string is previously converted at the time of compiling or loading a class. Thereby, conversion processing is bypassed during the execution of the program. Additionally, in the case of a normal JSP, conversion processing is not performed for every character string output instruction in a program. Instead, when an entire text on one web page is fixed, conversion processing is performed on the text at one time. As a result, the number of times of performing conversion processing is reduced, so that the efficiency in processing is improved.

The techniques of Japanese Patent Application Laid-open Publication No. 2005-332146 and WebMacro are effective especially when there are many character string constants. However, when there are many instructions to output the values of character string variables, conversion processing should be performed in many cases whenever these instructions are executed. Thereby, the processing is not efficient.

Moreover, previous conversion of a character string constant according to the technique of Japanese Patent Application Laid-open Publication No. 2005-332146 may results in fragmentation of the character string constant to be converted during the execution of a program. The fragmentation requires the character string constant to be converted in a plurality of processing, even though these conversions can be performed at one time in normal JSP processing. In this case, even if the number of character strings is small, the conversion processing takes a certain time. Hence, there is a risk to decrease the efficiency in an execution of a program due to an increase in the number of times of conversion processing.

SUMMARY OF THE INVENTION

The present invention provides a system for optimizing character string output processing. The system includes an acquiring section, a static converter, a first buffer, a dynamic converter and an output controller. The acquiring section acquires an output program, which sequentially executes a plurality of character string output instructions, and which thereby outputs a text in which a plurality of output character strings are combined. The static converter converts a character code set of a character string constant of at least one of the character string output instructions, each for outputting a character string constant, from a first code set for internal processing to a second code set for output, before the execution of the output program. The first buffer buffers the values of two or more character string variables to be outputted respectively by two or more of the character string output instructions without converting the character code set from the first code set, during the execution of the output program. The dynamic converter collectively converts the values of the two or more character string variables which have been buffered by the first buffer, from the first code set to the second code set. The output controller allows a character string constant whose character code set has been converted by the static converter and the values of the two or more character string variables whose character code set has been converted by the dynamic converter to be outputted as at least a part of the text. In addition, the present invention provides a program and a method, which cause an information processing device to function as the system.

BRIEF DESCRIPTION OF THE DRAWINGS

For a more complete understanding of the present invention, reference is now made to the following description taken in conjunction with the accompanying drawings.

FIG. 2a shows an example of an output program.
FIG. 2b shows a first example of a servlet program which is generated on the basis of the output program.
FIG. 6a shows an example of an already-compiled program.
FIG. 6b shows an example of a runtime program which is called when the already-compiled program is executed.

FIG. 22 shows a part corresponding to a character string output instruction in a JSP program, and a specific example of the part.

FIG. 23 shows a first implementation example of first and second buffering instructions.

FIG. 24 shows a second implementation example of the first and second buffering instructions.

FIG. 25 shows a part corresponding to a character string output instruction in a PHP program, and a specific example of the part.

FIG. 26a shows a first generation example of a control flow graph in the PHP program.

FIG. 26b shows a second generation example of a control flow graph in the PHP program.

DETAILED DESCRIPTION OF THE INVENTION

The following embodiment does not limit the invention according to the scope of claims, and all of the combinations of features described in the embodiment are not necessarily essential to the solving means of the invention.

Figure 1:
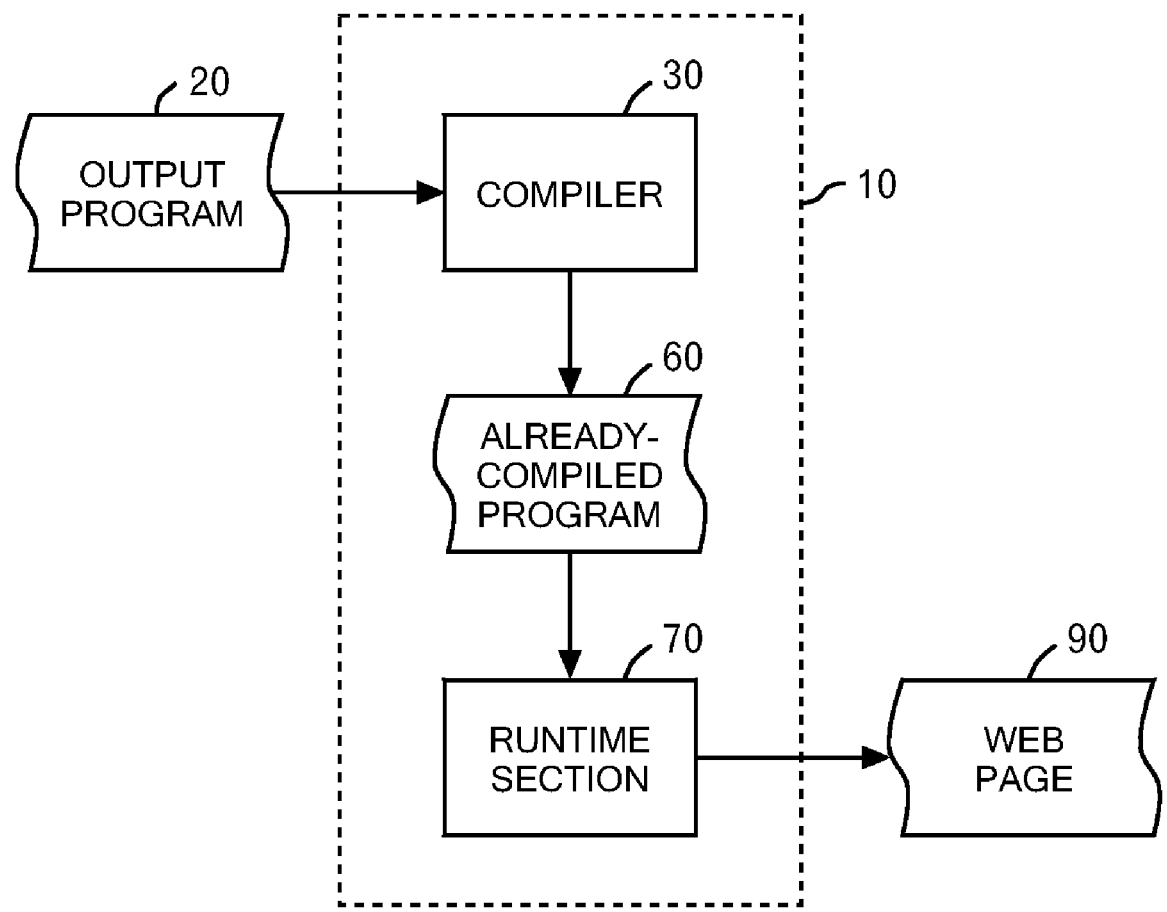
FIG. 1 shows a configuration of an information system.

FIG. 1 shows the entire configuration of an information system 10. The information system 10 includes a compiler 30 and a runtime section 70. The compiler 30 acquires an output program 20 for outputting a text. Then, by compiling the output program 20, the compiler 30 generates an already-compiled program 60. The output program 20 is a program which is written in, for example, Java Server Pages (JSP) or PHP (Hypertext Processor). The compiler 30 may generate Java bytecode by compiling the output program 20 using a JSP compiler or Java compiler. The generated already-compiled program 60 is outputted to the runtime section 70.

The runtime section 70 executes the already-compiled program 60 by use of a runtime library which is previously set. Thereby, the runtime section 70 generates a web page 90. The runtime section 70 may further compile the already-compiled program 60, which is Java bytecode, into a machine language by Just-in-Time Compilation as necessary. The web page 90 generated by executing the already-compiled program 60 is outputted to a viewer of the web page.

The information system 10 according to the embodiment improves efficiency in processing for converting a character code set in a program for outputting such a text, in a case where a character code set for internal processing is different from a character code set for output.

FIG. 2a shows an example of the output program 20. The output program 20 is a JSP program for outputting a text in Hyper Text Markup Language (HTML). Specifically, the output program 20 includes a character string output instruction 200 for instructing the output of a <ol> tag in the first line, and a character string output instruction 230 for instructing the output of a </ol> tag in the fifth line. In addition, the output program 20 includes a control instruction for loop in the second line, a character string output instruction 210 for instructing the output of a <li> tag in the beginning of the third line, and a character string output instruction 220 for generating a dynamic text in accordance with a business logic of a backend in the end of the third line. The dynamic text is a character string whose contents are not fixed unless a program is executed, and typically is a character string given as the value of a character string variable.

FIG. 2b shows a first example of a servlet program generated based on the output program 20. The output program 20 is compiled into a servlet program of Java language upon execution. For example, the character string output instruction 200 in FIG. 2a is compiled into out.write("<ol>") shown in the third line. The "out" is a variable which indicates the instance of a JSPWriter class, and an entity thereof is generated by a constructor shown in the second line. Moreover, the "write" is a method of the JSPWriter class, and has a function of outputting a character code set by setting a char type variable, in which a character string of the first code set for internal processing is stored as an argument.

Similarly, the character string output instruction 210 in FIG. 2a is compiled into out.write("<li>") shown in the fifth line, and the character string output instruction 220 is compiled into out.write(a dynamic text) shown in the sixth line. A method call is written into the part of the "dynamic text." With the method call, an inquiry is performed on a database server or other servers by using a variable i, and then the result of the inquiry is obtained as a character string data. What is written in this part varies in accordance with the object of a program. Moreover, the character string output instruction 230 is compiled into out.write("</ol>") shown in the eighth line.

The compiler 30 according to the embodiment can compile the output program 20 into this kind of servlet program. However, when the servlet program is executed, not only a dynamic text but also a character string constant requires a character code set to be converted so as to correspond to the character string output processing. This is inefficient since there are many character strings to be converted. For example, the character string constant <li> to be outputted by out.write in the fifth line is repeatedly outputted 100 times, and a character code set is converted in accordance with each output. In other words, each of the four characters of <li> is converted 100 times, that is, 400 characters are converted in total. However, this character string constant is previously fixed before the execution of a program. Accordingly, if a character code set is converted once, the conversion result could be reused afterwards. For these reasons, this process is inefficient.

Figures 2C, 3:
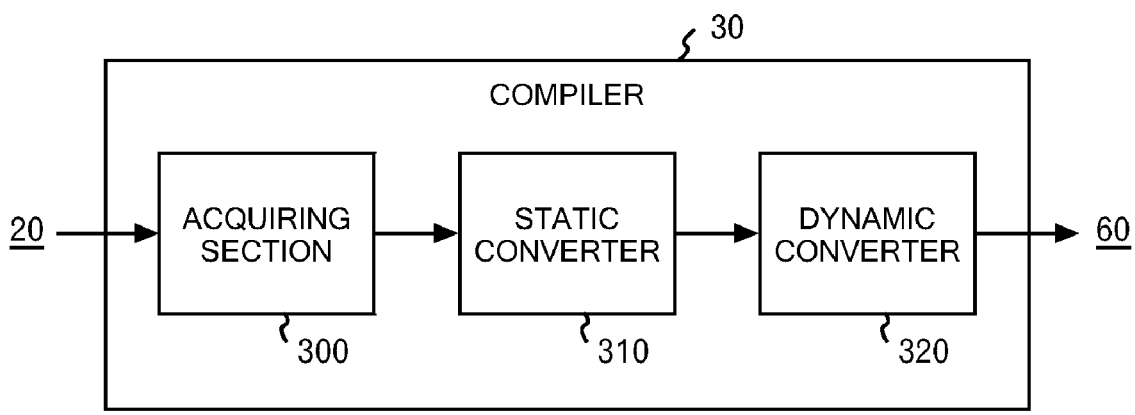
FIG. 2c shows a second example of the servlet program which is generated on the basis of the output program.
FIG. 3 shows a functional configuration of a compiler.

FIG. 2c shows a second example of the servlet program generated based on the output program 20. In the second example, the character string output instruction 200 in FIG. 2a is compiled into out.write(template_text_array1) shown in the seventh line. "template_text_array1" is a byte-type variable, and its contents are generated in the first line. The instruction of the first line converts the character code set of the character string constant <ol> into the second code set for output from the first code set for internal processing, and then the resultant of the conversion is replaced with a byte-type variable. Additionally, "write" is a method of the JSPWriter class similarly to the example of FIG. 2b, but is different from the example of FIG. 2b in that a byte-type variable is taken as an argument. Then, this method write outputs the contents of the variable given as the argument as it is, without converting the character code set.

Similarly, the character string output instruction 210 of FIG. 2a is compiled into out.write(template_text_array2) shown in the ninth line. "template_text_array2" is a byte-type variable, and its contents are generated by the second line. The instruction of the second line converts the character code set of the character string constant <li> into the second code set for output from the first code set for internal processing, and then the conversion result is replaced with a byte-type variable. Furthermore, the character string output instruction 230 of FIG. 2a is compiled into out.write(template_text_array3) shown in the 12th line. "template_text_array3" is a byte-type variable, and its contents are generated by the third line. The instruction of the third line converts the character code set of the character string constant </ol> into the second code set for output from the first code set for internal processing, and then the conversion result is replaced with a byte-type variable.

In this manner, if the conversion of a character code set is once performed on a character string constant at the beginning, it is efficient since the number of characters to be converted is small.

Moreover, the character string output instruction 220 in FIG. 2a is compiled into out.write(a dynamic text) shown in the 10th line. Since the contents of this dynamic text are not known until the program is executed, it is impossible to previously convert a character code set of the dynamic text. Accordingly, this method write takes a char-type variable as an argument similarly to the example of FIG. 2b. Then, at each time of execution, the character code set is converted into the second code set to be outputted.

The compiler 30 according to the embodiment can compile the output program 20 into this kind of servlet program, too. However, executing this servlet program may be inefficient since the number of conversions of a character code set is large. For example, the conversion of a character code set is performed 100 times by the instruction shown in the 10th line. Supposing the output character string of the ninth line has not statically been converted, the output character strings of both ninth and tenth lines can be collectively converted. Moreover, a character string to be outputted in the previous loop and a character string to be outputted in the current loop can be combined, and thereby collectively outputted. Thereby, the number of times of conversion processing can be reduced to less than 100 times. The conversion of a character code set takes time in accordance, not only with the number of characters to be converted, but also with the number of times of conversion processing. For this reason, the program of FIG. 2c is inefficient. On the contrary, the influence of efficiency improved by previously converting a character string constant may be offset so as to reduce the efficiency in processing.

On the other hand, the information system 10 according to the embodiment decreases not only the number of characters to be converted but also the number of times of conversion processing in a balanced manner. Accordingly it is possible to more efficiently execute the output program 20. Hereinafter, detailed descriptions thereof will be given.

FIG. 3 shows a functional configuration of the compiler 30. The compiler 30 is realized by the processing of controlling calculation processing and the execution order by a central processor. The compiler 30 includes an acquiring section 300, a static converter 310, and a dynamic converter 320. The acquiring section 300 acquires the output program 20. The output program 20 may be a program for outputting a tagged document, such as an HTML document, as an output character string. In this case, the acquiring section 300 may exclude a blank between an end tag and a start tag following the end tag, from a character string designed to be outputted in the acquired output program 20. Moreover, the acquiring section 300 may exclude a comment part which does not affect the display of a tagged document.

Before executing the acquired output program 20, the static converter 310 converts the character code set of a character string constant into the second code set for output from the first code set for internal processing, for at least one of character string output instructions for outputting a character string constant. To be concrete, the static converter 310 may insert an instruction for performing such conversion of a code set in the first line of the output program 20. It should be noted that "before executing the acquired output program 20" means before starting processing that is written in the output program 20 before optimization. Accordingly, an instruction to be performed before execution may be inserted into the already-compiled program 60, or may be executed by the runtime section 70 before starting the execution of the already-compiled program 60 (for example, at the time of loading a class). Moreover, the static converter 310 may generate, in the output program 20, an instruction for converting the code set of a character string constant that is to be outputted. The output program 20 which has already been processed by the static converter 310 is outputted to the dynamic converter 320.

The dynamic converter 320 causes a first buffer 712 (FIG. 8) to buffer the values of two or more character string variables to be outputted by two or more character string output instructions without converting the character code set from the first code set, during the execution of a program. Moreover, the dynamic converter 320 collectively converts the character code set of the values of the two or more character string variables buffered by the first buffer 712 into the second code set from the first code set. Here, the processing of collectively converting all means to convert the character code set of character strings, in which a plurality of character strings are combined, by repeating conversion processing for at least the number of times less than the number of the character strings, preferably, by one conversion processing. Specifically, the dynamic converter 320 may generate, in the output program 20, a first buffering instruction for causing the first buffer 712 to buffer the value of a character string variable, or may insert, into the output program 20, a conversion instruction for converting the character string in the first buffer 712 into the second code set. The output program 20 in which an instruction is generated/inserted is outputted to the runtime section 70 as the already-compiled program 60.

Figure 4:
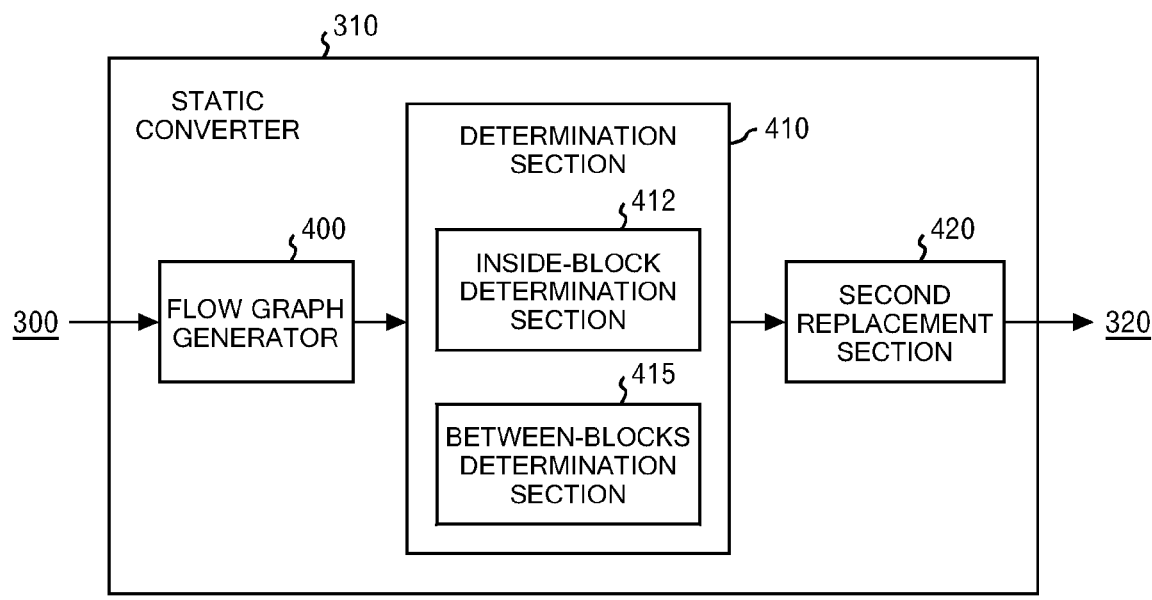
FIG. 4 shows a functional configuration of a static converter.

FIG. 4 shows a functional configuration of the static converter 310. The static converter 310 has a flow graph generator 400, a determination section 410, and a second replacement section 420. The flow graph generator 400 selects a character string output instruction in the acquired program 20 and a function call which can execute the character string output instruction. Then, the flow graph generator 400 generates a control flow graph for the selected character string output instruction and function call. Based on this control flow graph, the determination section 410 determines whether or not a character string to be outputted is previously converted into the second code set before executing the output program 20 for each character string output instruction for outputting a character string constant. Specifically, the determination section 410 has an intra-block determination section 412 and an inter-block determination section 415.

For each basic block in the control flow graph, the intra-block determination section 412 determines whether or not a character code set is previously converted before executing the output program 20, for a plurality of character string output instructions to be successively executed in a relevant basic block, on the basis of the total number of character strings to be outputted. In a case where a plurality of character string output instructions for outputting a character string variable are executed successively without including a character string output instruction for outputting a character string constant, the determination here is based on the total number of characters of these successive character string constants.

More specifically, suppose that one conversion processing of a character code set takes time required for conversion processing for H characters, regardless of the actual number of characters. In this case, it is inefficient to perform conversion processing of a character code set for converting less than H characters. Accordingly, when converting the number less than H of characters, it is sometimes desirable not to convert the character code before executing a program, for the purpose of taking advantage of an opportunity to collectively convert less than H characters and other characters by combining them, even if the conversion is a conversion of a character string constant. On the other hand, if H or more characters are converted during the execution of a program, it would take time in accordance with the number of the characters. Hence, when the conversion is a conversion of a character string constant, it is desirable to perform the conversion before executing a program. Accordingly, in a case where a plurality of character string output instructions for outputting character string constants are successively executed without a character string output instruction for outputting a character string variable, if the number of characters to be outputted by these instructions is the predetermined reference value H or more, the intra-block determination section 412 determines to previously convert the character code set of each character string constant before executing the output program 20. When the number of characters is less than the reference value H, the intra-block determination section 412 determines not to convert the character code set of each character string constant before executing the output program 20.

In the case of a character string output instruction, which is a set of character string output instructions in which the total number of characters of character strings to be outputted is smaller than the predetermined reference value, and which is executed in the beginning or the end of a basic block, the inter-block determination section 415 performs as follows. In this case, the inter-block determination section 415 determines whether or not a character code set is previously converted before executing the output program 20, further on the basis of the number of characters to be outputted by character string output instructions included in other basic blocks. For example, the inter-block determination section 415 performs as follows. The inter-block determination section 415 estimates a probability that the basic block and each of a plurality of other blocks are successively executed. Upon the estimation, the inter-block determination section 415 calculates the number of characters of character string constants to be successively outputted in a case where the basic block and each of the plurality of other basic blocks are successively executed. Then, the inter-block determination section 415 calculates an expected value of the number of characters of the successive character string constants, on the basis of the calculated probability and the number of the characters. The inter-block determination section 415 determines to previously convert a character code set if the expected value is the reference value H or more. The inter-block determination section 415 determines not to convert the character code set if the expected value is less than the reference value H.

The second replacement section 420 replaces, with a second buffering instruction, a character string output instruction whose character code set has been determined to be previously converted into the second code set. The second buffering instruction is an instruction for adding a character string to a second buffer 715 (FIG. 8) to be described later, during the execution of the output program 20. The second buffer 715 temporarily stores a character code constant, whose code set has been converted into the second code set, and the value of a character string variable, for the purpose of collectively converting them, and for causing the output controller 710 (FIG. 8) to output the conversion result.

Figure 5:
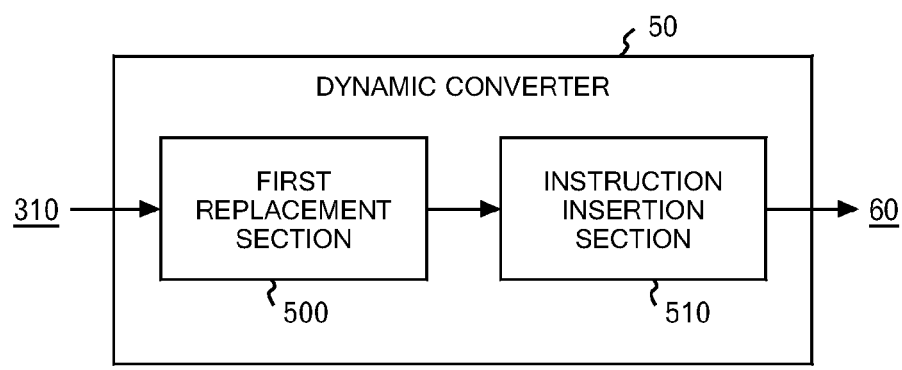
FIG. 5 shows a functional configuration of a dynamic converter.

FIG. 5 shows a functional configuration of the dynamic converter 320. The dynamic converter 320 has a first replacement section 500 and an instruction insertion section 510. The first replacement section 500 replaces, with the first buffering instruction, each of a plurality of character string output instructions which have not been converted into the second buffering instruction. The character string output instruction which has not been converted into the second buffering instruction includes a character string output instruction for outputting the value of a character string variable as well as a character string output instruction in which the number of characters of a character string constant to be outputted is less than the reference value H. Moreover, the first buffering instruction is an instruction for adding a character string to the first buffer 712 during the execution of the output program 20.

The instruction insertion section 510 inserts a conversion instruction into a part of the output program 20, which part is to be executed before the second buffering instruction, and which part is also to be executed after the plurality of first buffering instructions. By the conversion instruction, a plurality of character strings stored in the first buffer 712 are collectively converted into the second code set, and then the conversion result is added to the second buffer 715. In other words, character strings before conversion are sequentially added to the first buffer 712 until character strings which have already been converted are required to be outputted. Thereafter, the character strings are collectively converted, and the conversion result is added to the second buffer 715. In this manner, while keeping the order of outputting character strings, it is possible to reduce the number of conversions by accumulating character strings as many as possible in the first buffer 712, and then by collectively converting the accumulated character strings.

FIG. 6a shows an example of the already-compiled program 60. In reality, the already-compiled program 60 is an instruction code string such as Java bytecode or binary data such as a PHP intermediate code. However, for convenience of descriptions, FIG. 6a shows a pseudocode showing the meaning. The second replacement section 420 replaces the character string output instruction 200 of FIG. 2a into a second buffering instruction 610 in the seventh line. The second buffering instruction 610 is an instruction for adding a character string whose character code set has already been converted by the first line, to the second buffer 715. In addition, the first replacement section 500 replaces the character string output instruction 210 of FIG. 2a into the first buffering instruction 620 in the ninth line. The first buffering instruction 620 is an instruction for adding a character string <li> to be outputted, to the first buffer 712, without converting the character code set from the first code set before conversion. Additionally, the first replacement section 500 replaces the character string output instruction 220 of FIG. 2a into the first buffering instruction 630 in the 10th line. The first buffering instruction 630 is an instruction for adding a dynamic text to be fixed during the execution of the output program 20, to the first buffer 712, without converting the character code set from the first code set before conversion. Moreover, the second replacement section 420 replaces the character string output instruction 230 of FIG. 2a into the second buffering instruction 640 in the 12th line. The second buffering instruction 640 is an instruction for adding a character string whose character code set has already been converted in the third line, to the second buffer 715. Furthermore, the second buffering instruction 640 plays a role as a conversion instruction as well. Descriptions thereof will be given with reference to FIG. 6b.

FIG. 6b shows an example of a runtime program to be invoked, as associated with the execution of the already-compiled program 60. In reality, the runtime program may also be an instruction code string such as Java bytecode, or binary data. FIG. 6b shows a pseudocode showing the meaning. The first to fourth lines show a method write which takes, as an argument, a char-type variable, that is, a character string before conversion. The fifth to eighth lines show a method write takes, as an argument, a byte-type variable, that is, a character string after conversion. In other words, the second buffering instructions 610 and 640 of FIG. 6a invoke the method shown in the fifth to eighth lines, and the first buffering instructions 620 and 630 of FIG. 6a invoke the method shown in the first to fourth lines. When invoked, the method shown in the first to fourth lines adds a character string given with an argument str to a variable charBuffer indicating the first buffer 712 (the second line), and then increases a variable cb_index indicating the length of the first buffer 712 (the third line).

On the other hand, when invoked, the method shown in the fifth to eighth lines invokes a method writeBB, which is the second buffering instruction, after invoking a method flushCB, which is a conversion instruction. The 13th to 21st lines show the method flushCB. When the first buffer 712 is determined not to be empty in the 14th line, the 17th to 19th lines are executed. A character string in the first buffer 712 is converted into the second code set in the 17th line, and the conversion result is stored in the line of an element bb_index of a variable byteBuffer indicating the second buffer 715, or in the following one. The variable bb_index indicating the length of the second buffer 715 is increased in the 18th line, and cb_index indicating the length of the first buffer 712 is reset to 0 in the 19th line. In addition, the 9th to 12th lines show the method writeBB. When invoked, the method adds a character string given by an argument array to the variable byteBuffer indicating the second buffer 715 (the 10th line), and increases the variable bb_index indicating the length of the second buffer 715.

In this manner, the method write, which takes a byte-type variable as an argument, executes a conversion instruction before buffering a first variable. Accordingly, the method write plays roles of both first buffering instruction and conversion instruction.

Figure 7:
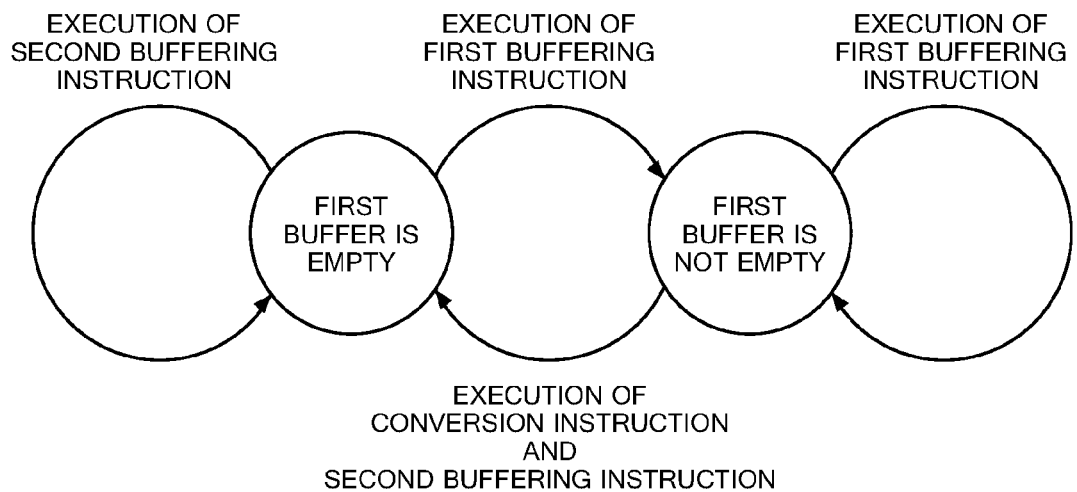
FIG. 7 shows a state transition of a first buffer at the time when the already-compiled program is executed.

FIG. 7 shows the state transition of the first buffer 712 associated with the execution of the already-compiled program 60. When the second buffering instruction is executed in the state where the first buffer 712 is empty, a character string is added to the second buffer 715, so that the first buffer 712 remains empty, and that the state does not transit. When the first buffering instruction is executed in the state where the first buffer 712 is empty, a character string is added to the first buffer 712, so that the state of the first buffer 712 transits to a state of not being empty. When the first buffering instruction is executed in the state where the first buffer 712 is not empty, a character string is further added to the first buffer 712, so that the state does not transit. When the conversion instruction and the second buffering instruction are executed in the state where the first buffer 712 is not empty, character strings stored in the first buffer 712 are collectively converted, and the conversion result is added to the second buffer 715. Moreover, character strings after conversion by the second buffering instruction are added to the second buffer 715. Then, the state of the first buffer 712 transits to the state of being empty.

Figure 8:
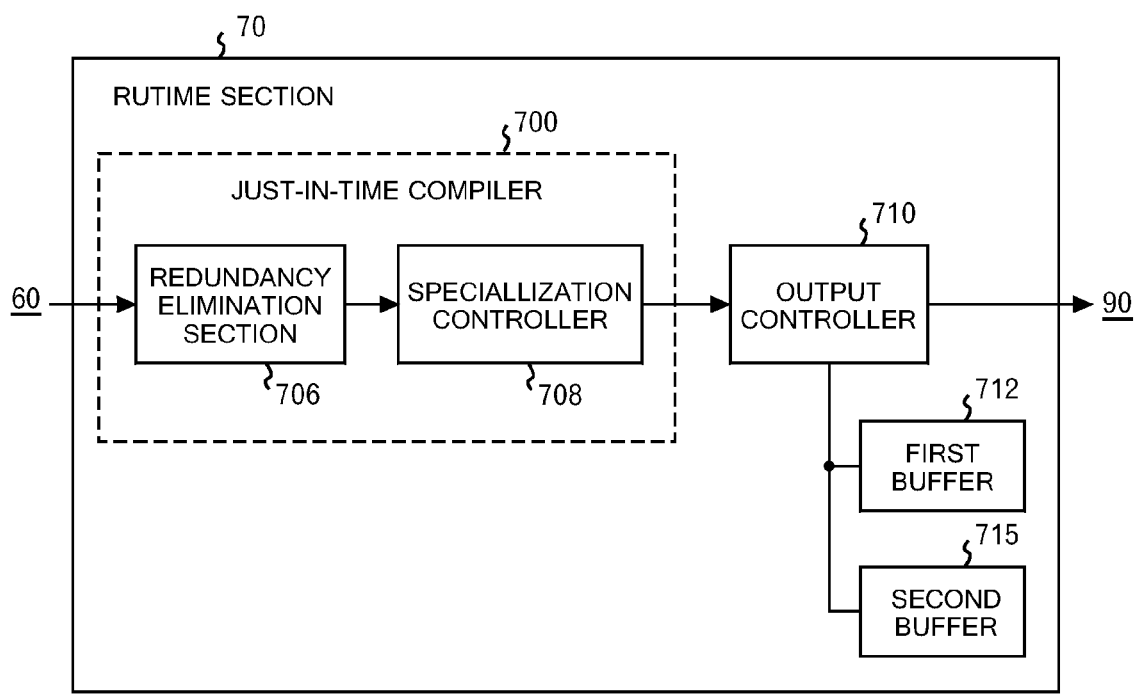
FIG. 8 shows a functional configuration of a runtime section.

FIG. 8 shows a functional configuration of the runtime section 70. The runtime section 70 has a Just-in-Time compiling section 700, an output controller 710, the first buffer 712 and the second buffer 715. The runtime section 70 acquires and then executes the already-compiled program 60, and plays a role as a virtual machine or a class library in Java language. The runtime section 70 may execute the already-compiled program 60 with an interpreter or a just-in-time compiler. However, in the case shown in FIG. 8, the runtime section 70 includes the Just-in-Time compiling section 700 functioning as a just-in-time compiler. In addition, the runtime section 70 includes the output controller 710, which is realized by a class library, and further includes the first buffer 712 and the second buffer 715, which are regions to be secured in a memory during and before the execution of a class library.

The Just-in-Time compiling section 700 includes a redundancy elimination section 706 and a specialization controller 708. In addition, the Just-in-Time compiling section 700 includes other functions generally used as compiler optimization techniques. After the Just-in-Time compiling section 700 performs optimization processing such as inline expansion, the redundancy elimination section 706 eliminates conversion instructions other than one to be executed first, from a plurality of conversion instructions to be successively executed without first buffering instructions sandwiched therebetween. For example, as shown in FIG. 6b, the conversion instruction in the sixth line in FIG. 6b is executed whenever a converted character string is outputted. However, if the first buffer 712 is empty, it is pointless to execute the conversion instruction. Moreover, when converted character string constants are successively outputted, it is useless except the first time. The redundancy elimination section 706 eliminates such redundant conversion instructions. Furthermore, the redundancy elimination section 706 may eliminate redundant conversion instructions by a partial redundancy elimination technique.

The specialization controller 708 detects an execution path, in which the total number of characters of character strings to be outputted successively exceeds the reference value, from among a plurality of execution paths in the already-compiled program 60, supposing there is no branch to another execution path or confluence. Then, the specialization controller 708 selects an instruction sequence which executes only the detected execution path, and previously converts the character code set of the character string constant in the instruction sequence before the execution of the already-compiled program 60. Afterwards, the specialization controller 708 generates the selected instruction sequence and an instruction sequence which executes each of the other execution paths. Then the specialization controller 708 controls so that any of these instruction sequences is selectively executed on the basis of a predetermined condition determination. In addition, the Just-in-Time compiling section 700 may perform other optimization processing general as a runtime compiler.

The output controller 710 is realized by the runtime program shown in FIG. 6b, or the like, and controls the output processing of character strings. Specifically, the output controller 710 stores, in the first buffer 712, the value of a character string variable and a character string constant which has not been converted previously, whenever a corresponding character string output instruction is executed. Moreover, in response to the execution of a conversion instruction, the output controller 710 converts the character code set of the character string stored in the first buffer 712, and stores the converted character string in the second buffer 715. Then, at a predetermined timing, the output controller 710 extracts, from the second buffer 715, a character string constant, whose character code set has been converted by the static converter 310, and the values of two or more character string variables, whose character code set has been converted by the dynamic converter 320. Then the output controller 710 outputs the character string constant and these character string variables. The predetermined timing may be, for example, for each page of a web page, or every time the data size of the second buffer 715 reaches to a predetermined upper limit.

Figures 9, 10:
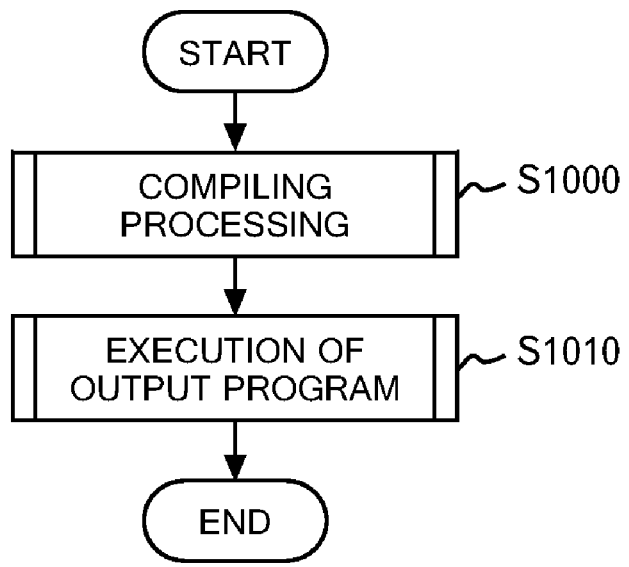
FIG. 9 shows an example of a web page.
FIG. 10 shows a flowchart of processing in which the output program is compiled and then executed.

FIG. 9 shows an example of the web page 90. By executing the already-compiled program 60, the web page 90 that is an HTML document is outputted. The web page 90 includes <ol>, which is a start tag, in the first line, and also includes a <li> tag and a dynamic text in each line from the second to the x-th lines. The dynamic text is, for example, data including company names and prices, which were retrieved from a database server during the execution of a program. Moreover, the web page 90 includes </ol>, which is an end tag, in the x+1-th line.

FIG. 10 shows a flowchart of processing where the output program 20 is compiled to be executed. The compiler 30 compiles the output program 20, and replaces a character string output instruction and inserts a conversion instruction as necessarily (S1000). The runtime section 70 outputs a web page or the like, which is character strings, by executing the already-compiled program 60 which is generated by compiling the output program 20 (S1010).

Figure 11:
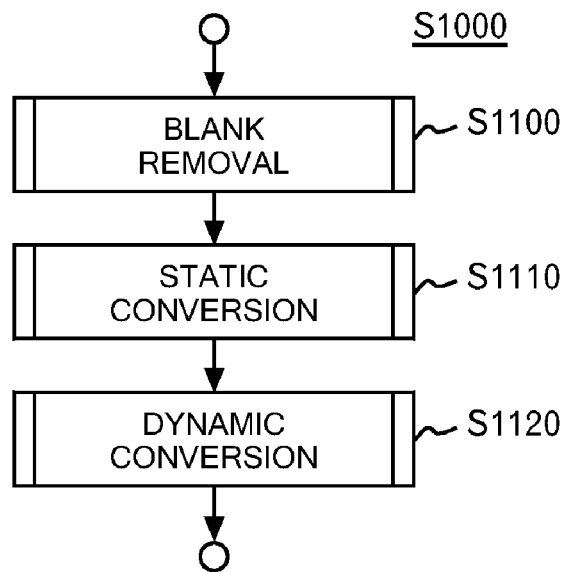
FIG. 11 shows a flowchart of processing in S1000.

FIG. 11 shows a flowchart of the processing in S1000. The acquiring section 300 acquires the output program 20. Then, the acquiring section 300 removes a blank and the like between the end tag and the following start tag from a character string designated to be outputted by the acquired output program 20 (S1100). In addition to the blank, the acquiring section 300 may remove control characters, such as a tab, which do not influence HTML tags. Moreover, the acquiring section 300 may remove a comment part in HTML, which starts with <!--, and which ends with -->.

Next, before executing the output program 20, the static converter 310 converts the character code set of a character string constant of at least one character string output instruction for outputting a character string constant, from the first code set for internal processing to the second code set for output (S1110). The character string constant whose character code set is to be previously converted is selected in accordance with the number of characters of a character string to be converted. Subsequently, the dynamic converter 320 changes the output program 20 in order to collectively convert the character code set of the values of two or more character string variables which have been buffered by the first buffer 712, from the first code set to the second code set (S1120). For example, the dynamic converter 320 generates an instruction for adding a character string to the first buffer 712, and inserts a conversion instruction for collectively converting the character code set of character strings in the first buffer 712.

Figure 12:
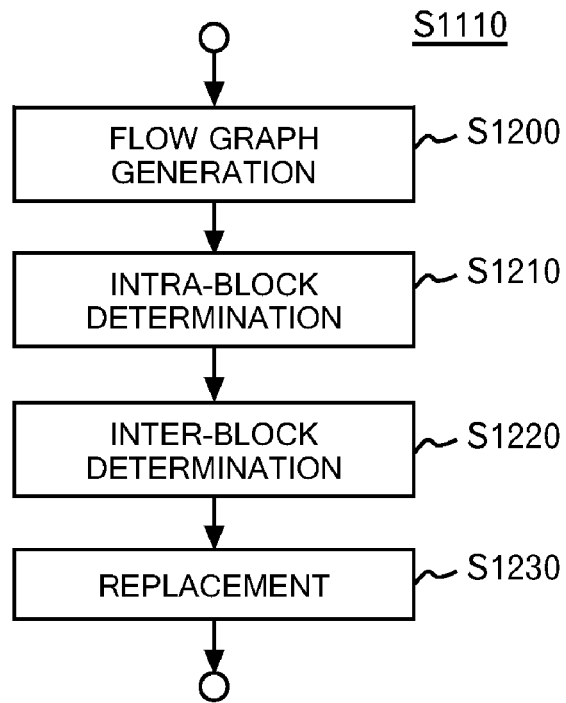
FIG. 12 shows a flowchart of processing in S1100.
Figure 13:
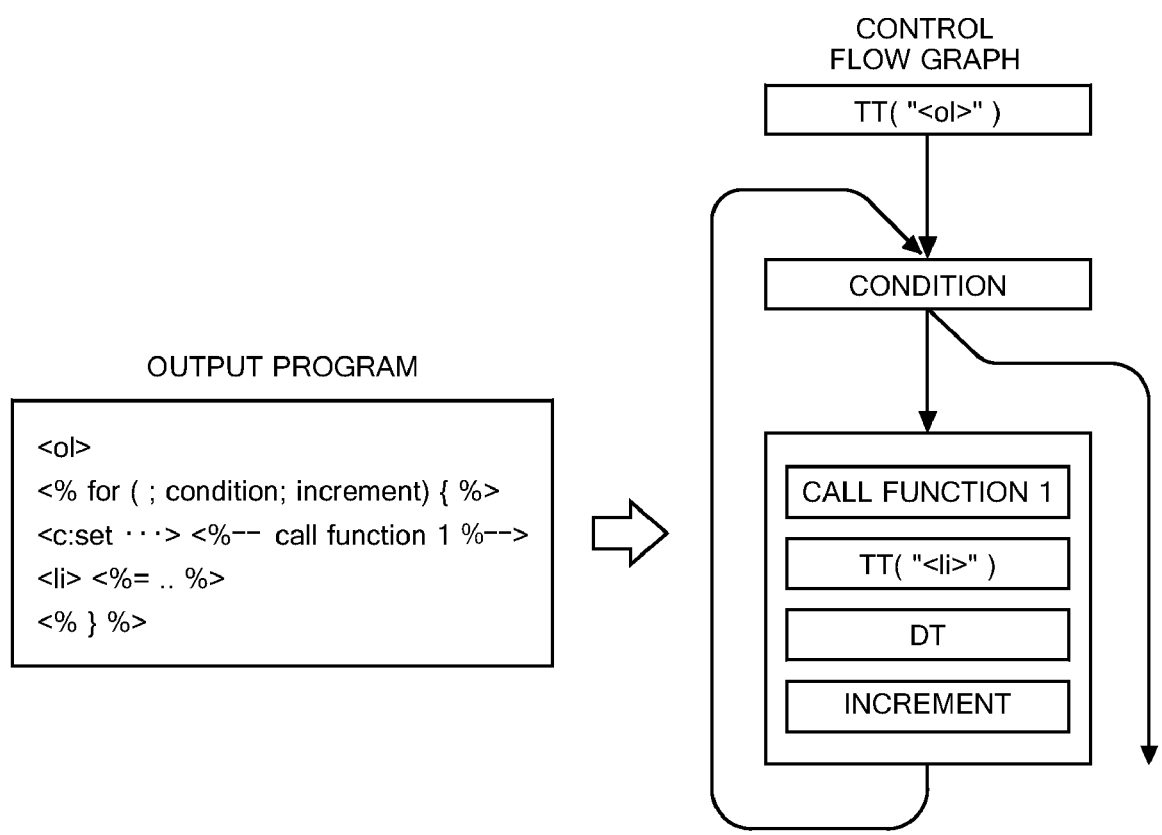
FIG. 13 shows an example of a control flow graph which is generated.
Figure 14:
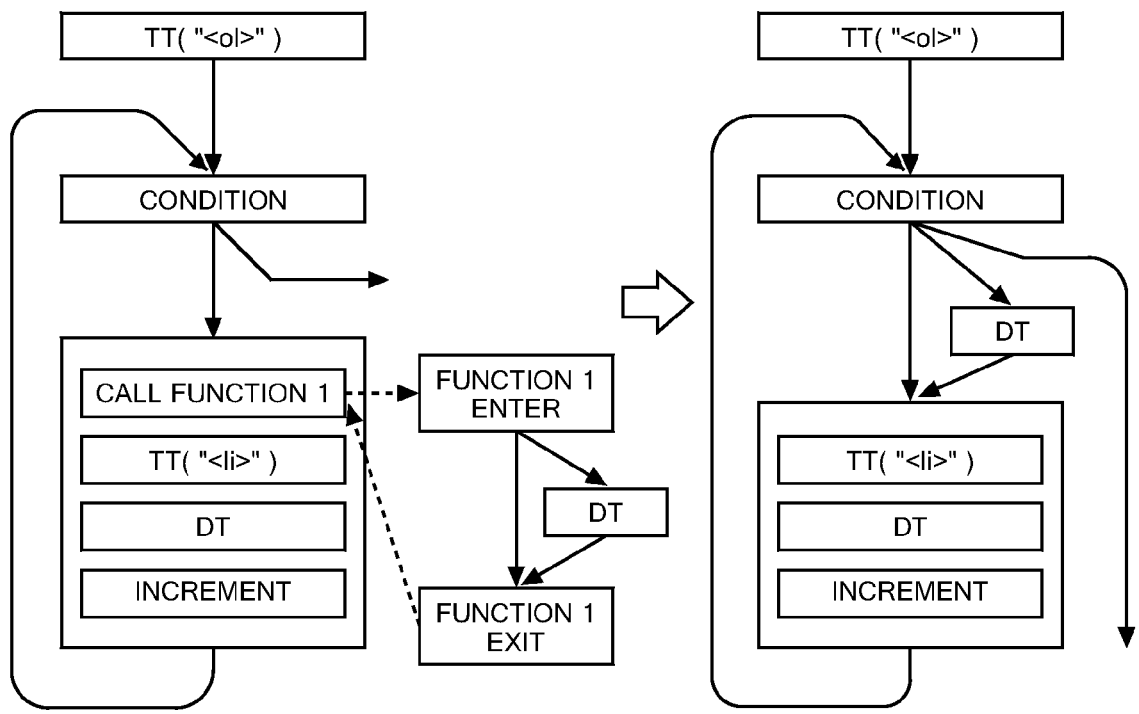
FIG. 14 shows a first example of simplification of a control flow graph.
Figure 15:
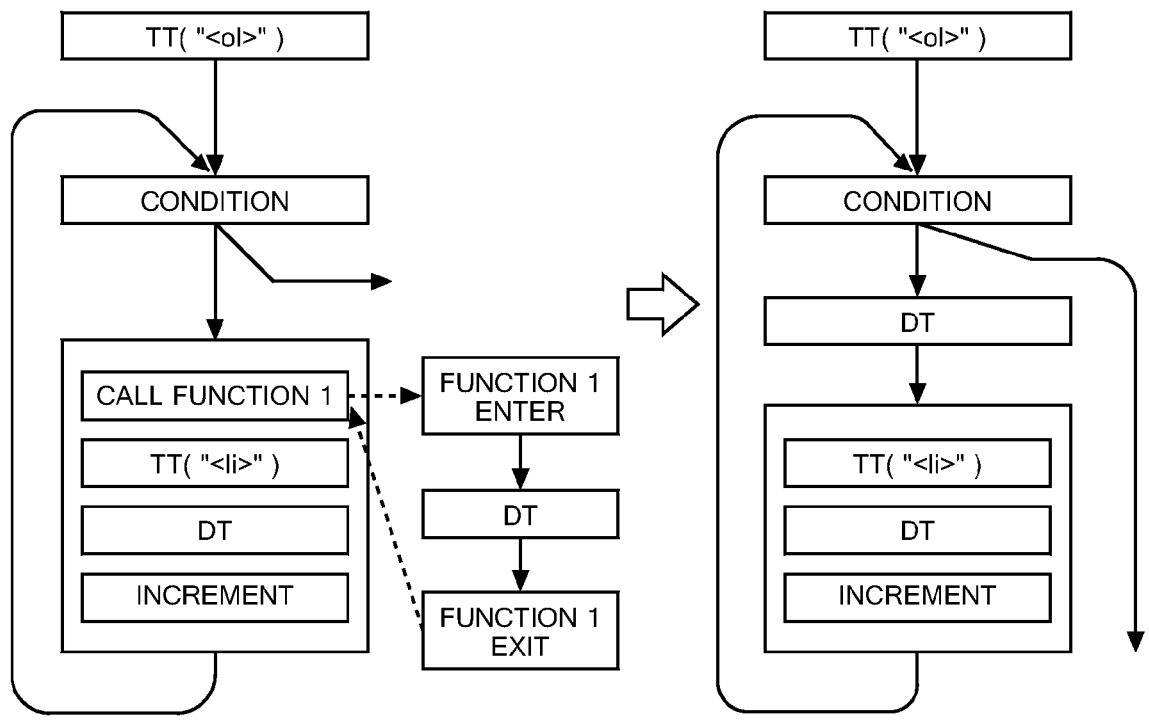
FIG. 15 shows a second example of simplification of a control flow graph.

FIG. 12 shows a flowchart of the processing in S1110. The flow graph generator 400 selects a character string instruction from among the acquired output program 20, and also selects a function call which can execute the selected character string output instruction. Then the flow graph generator 400 generates a control flow graph for the selected character string output instruction and function call (S1200). With reference to FIGS. 13 to 15, descriptions will be given of the processing for generating the control flow graph.

FIG. 13 shows an example of the control flow graph to be generated. The flow graph generator 400 analyzes the control structure of the output program 20 shown on the left of FIG. 13, and then generates the control flow graph shown on the right of FIG. 13. In the control flow graph, each node indicates a basic block, and each edge indicates a flow of the control. In order to generate a control flow graph, the flow graph generator 400 may perform as follows, for example. Specifically, the flow graph generator 400 temporarily compiles the output program 20 written in JSP into Java language. Subsequently, the flow graph generator 400 analyzes the compiled program with a flow analyzer for Java language, and then generates the control flow graph on the right of FIG. 13.

In order to generate the control flow graph, the flow graph generator 400 firstly selects a basic block including character string output instructions and function calls which can execute the character string output instructions. Then, the flow graph generator 400 removes basic blocks which have not been selected. Subsequently, the flow graph generator 400 connects incoming edges and outgoing edges of the removed basic blocks. Moreover, the flow graph generator 400 selects only instructions which influence control branches, character string output instructions, and function calls which can execute the character string output instructions, from among the selected basic block. Then, the flow graph generator 400 removes other instructions. In this manner, the control flow graph on the right of FIG. 13 is generated. In the graph, a character string output instruction for outputting a character string constant is represented by TT, and a character string output instruction for outputting the value of a character string variable is represented by DT. Subsequently, the flow graph generator 400 simplifies the control flow graph in order to facilitate the analysis.

FIG. 14 shows a first example of the simplification of the control flow graph. As for a function call on the left of FIG. 14, it is not clear whether or not a DT instruction is executed at a call destination. Hence, the flow graph generator 400 converts this function call into a control flow including an execution path which executes a DT instruction and an execution path which does not execute a DT instruction. A control flow graph after the conversion is shown on the right of FIG. 14. Instead of this, the flow graph generator 400 may generate an accurate control flow graph by performing an inline expansion on a function at a call destination in a case where the function at the call destination is statically fixed.

FIG. 15 shows a second example of the simplification of the control flow graph. When it is possible to analyze the fact that a DT instruction is executed highly frequently in the function at a call destination, the flow graph generator 400 may replace the function call with the DT instruction, and may thus generate a control graph shown on the right of FIG. 15. By using this kind of approximate control flow graph, it is possible to simplify the structure of the control flow graph, and thereby to promptly perform a subsequent determination.

Here, the description will be given by referring to FIG. 12, again. Next, the intra-block determination section 412 analyzes the local structure in each basic block in the control flow graph. Thereby, the intra-block determination section 412 determines whether or not the character code set of a character string constant in the basic block is previously converted before the execution of the output program 20 (S1210). Detailed descriptions will be given of this determination with reference to FIG. 16.

Figure 16:
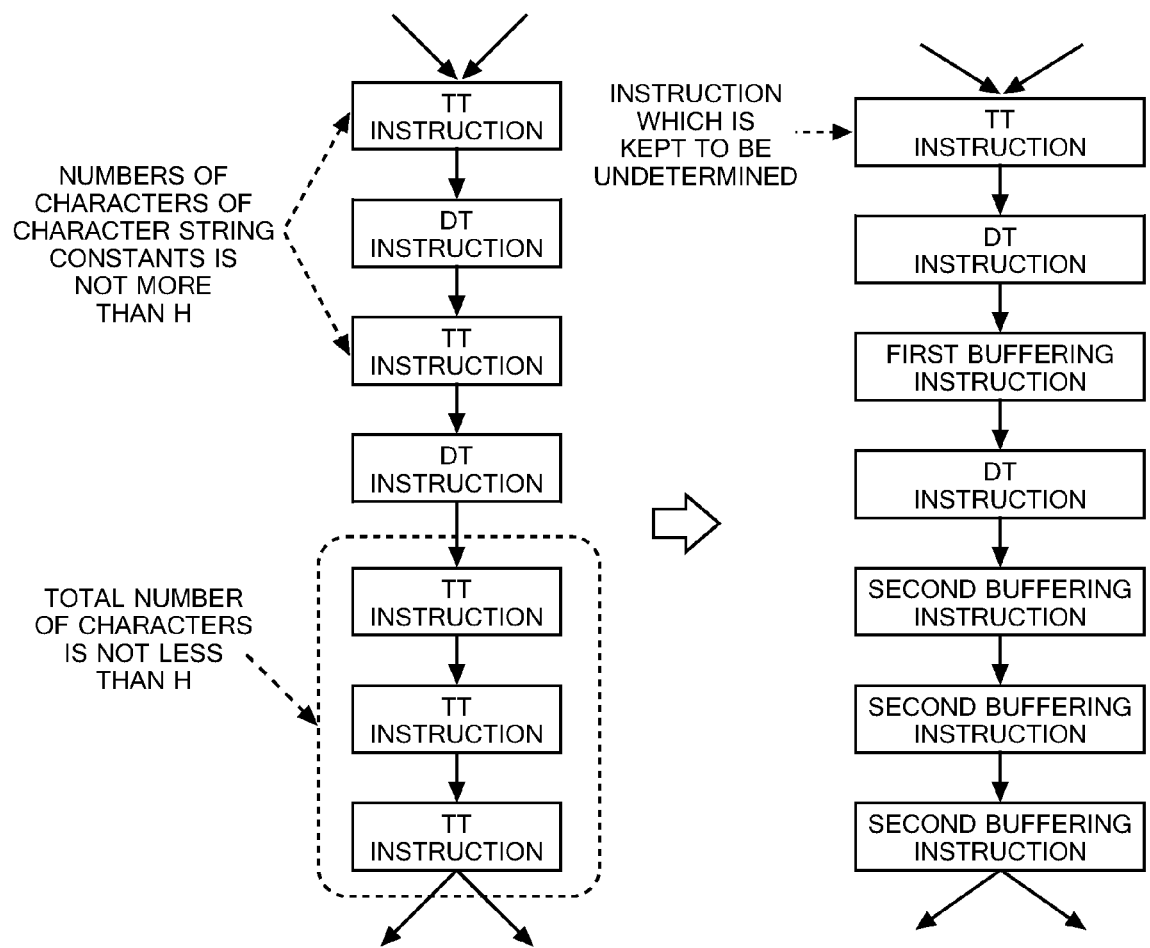
FIG. 16 shows an example of a determination result by an intra-block determination section.

FIG. 16 shows an example of the result of the determination by the intra-block determination section 412. Due to the processing in S1200, a plurality of character string output instructions are successively arrayed in each basic block. This array is shown on the left of FIG. 16. The intra-block determination section 412 firstly scans each character string output instruction from the top in execution order, and thereby detects an instruction for outputting a character string constant (a TT instruction). If the TT instruction is detected, the intra-block determination section 412 selects all the TT instructions successive to the TT instruction. In other words, character string constants to be outputted by these instructions compose corresponding parts of character strings to be successively outputted without including the values of character string variables therebetween. Then, the intra-block determination section 412 calculates the total number of characters of the character string constants to be outputted by all the TT instructions.

The intra-block determination section 412 determines whether or not the calculated total number of the characters is not less than the reference value H. Then, the intra-block determination section 412 determines to previously convert the character code set of each character string to be outputted on condition that the total number of the characters to be outputted is not less than the reference value H. For example, in the control flow graph on the left of FIG. 16, the TT instruction at the top outputs H or less characters as a character string constant. For this reason, the intra-block determination section 412 does not determine to previously convert the character code set of the character string to be outputted by this TT instruction. It is the same to a TT instruction to be executed third from the top. On the other hand, a TT instruction to be executed fifth from the top is executed successively with sixth and seventh instructions, and the total number of the output character strings is not less than the reference value H. Accordingly, the intra-block determination section 412 determines to previously convert the character code set of the character strings to be outputted by these TT instructions.

Moreover, the intra-block determination section 412 determines not to previously convert the character code set of a character string to be outputted before executing the output program 20 on the following condition. Specifically, at least one character string output instruction to be successively executed, which has the total number of characters of character string constants to be outputted less than a predetermined reference value, is successively executed after a character string output instruction for outputting the value of a character string variable as well as being successively executed before a character string output instruction for outputting the value of the character string variable. For example, the TT instruction to be executed third from the top is successive with the second and forth DT instructions. Accordingly, it is determined not to previously convert a character code set of the TT instruction.

A replacement result based on the determination result is shown on the right of FIG. 16. The third TT instruction from the top has been replaced with the first buffering instruction. Even if it is the same TT instruction, each TT instruction successive from the fifth to seventh from the top is replaced with the second buffering instruction. In addition, the top TT instruction is undetermined since the top TT instruction does not match the conditions. The determination result is held in a memory by the intra-block determination section 412.

It should be noted that "successive" in the descriptions of FIG. 16 means to be successive in the control flow graphs described with reference to FIGS. 13 to 15, and does not mean to have been written so as to be successively executed in the output program 20. In other words, "successive" means to be successively executed in the case of focusing only a condition branch instruction, a confluence instruction and a character string output instruction.

Here, the description will be given by referring to FIG. 12, again. Next, the inter-block determination section 415 performs as follows, for character string output instructions, which are a set of character string output instructions where the total number of characters of character strings to be outputted is smaller than the predetermined reference value, and which is executed at the beginning or the end of a basic block. Specifically, the inter-block determination section 415 determines whether or not a character code set is previously converted before executing the output program 20, further on the basis of the number of characters to be outputted by character string output instructions included in other basic blocks (S1220). A specific example of this determination will be described with reference to FIG. 17.

Figure 17:
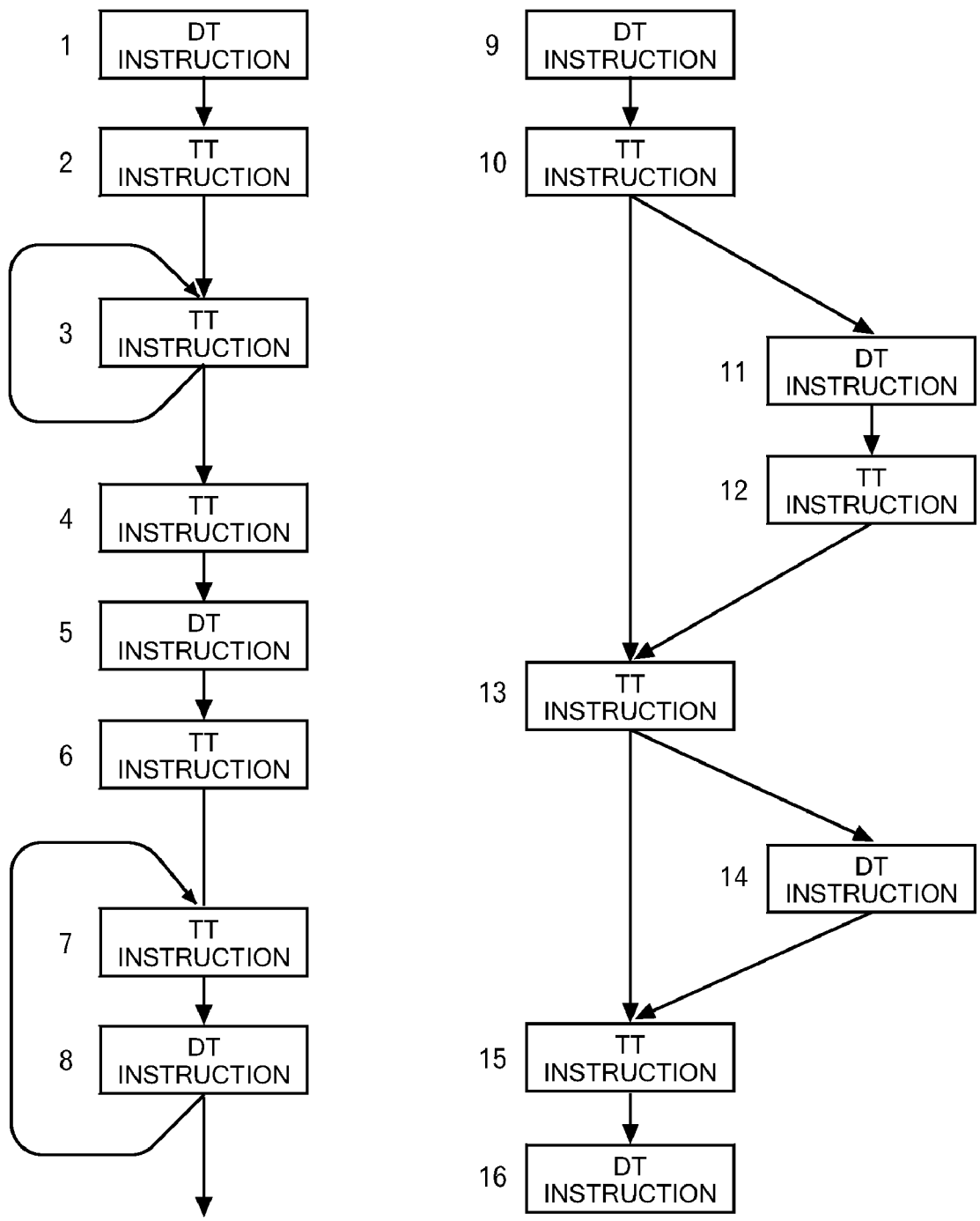
FIG. 17 shows an example of a control flow graph for which determination is to be made by an inter-block determination section.

FIG. 17 shows an example of a control flow graph to be a target of the determination by the inter-block determination section 415. At this point, TT instructions whose determination results are not determined are sandwiched between two of the DT instructions and the second buffering instructions, and always pass a branch or a confluence point of control, or are adjacent to a branch or a confluence point of control. In FIG. 17, the TT instructions which have already been determined to be replaced with the second buffering instructions are also not discriminated from the other TT instructions, and are described as the TT instruction. However, the inter-block determination section 415 does not change determination for the TT instructions which have already been determined, but determines undetermined TT instructions.

Firstly, the inter-block determination section 415 categorizes execution paths each successively including the TT instructions into a plurality of groups G which are non-connected to each other. It should be noted that the group G described here is an example of a block group according to the present invention, and is a group which includes at least one basic block including a character string output instruction where a determination whether or not a character code set is previously converted is not made by the intra-block determination section 412. In other words, it suffices that the inter-block determination section 415 generates only a group of this kind, which includes at least one basic block. However, all the basic blocks including the TT instructions may be categorized into groups in order to simplify the processing. On the left of FIG. 17, the inter-block determination section 415 categorizes, in a first group G1, an infinite execution path in a manner of (2, 3, 4), (2, 3, 3, 4), and (2, 3, 3, 3, 4) . . . . Incidentally, each bracket ( ) indicates one execution path, and a numeral in a bracket indicates a number for identifying a basic block. Any of these execution paths is sandwiched between the top DT instruction and the fifth DT instruction from the top, and is non-connected to other groups. Moreover, the inter-block determination section 415 categorizes (6, 7) and (7) into a second group G2. (6, 7) is sandwiched between the fifth and eighth DT instructions from the top. In addition, (7) is sandwiched between the eighth DT instruction in a previous iteration and the eighth DT instruction in a current iteration.

Furthermore, as shown on the right of FIG. 17, the inter-block determination section 415 categorizes, into a third group G3, each execution path of (10), (10, 13), (10, 13, 15), (12, 13), (12, 13, 15) and (15). The execution path (10) is sandwiched between the 9th and 11th DT instructions, the execution path (10, 13) is sandwiched between the 9th and 14th DT instructions, and the execution path (10, 13, 15) is sandwiched between the 9th and 16th DT instructions. Moreover, the execution path (12, 13) is sandwiched between the 11th and 14th DT instructions, the execution path (12, 13, 15) is sandwiched between the 11th and 16th DT instructions, and the execution path (15) is sandwiched between the 14th and 16th DT instructions.

Next, the inter-block determination section 415 performs the following processing on each group. To be specific, firstly, the inter-block determination section 415 determines to previously convert the character code set of all the character string constants in the group if the number of characters of character string constants to be outputted successively is not less than the reference value H in each of the execution paths in the group. Then, the inter-block determination section 415 replaces each character string output instruction with the second buffering instruction. On the other hand, the inter-block determination section 415 determines not to previously convert the character code set of all the character string constants in the group if the number of characters of character string constants to be successively outputted is less than the reference value H in each of the execution paths in the group. Then, the inter-block determination section 415 replaces each character string output instruction with the first buffering instruction.

If an execution path where the number of characters of character string constants is not less than the reference value H and an execution path where the number of characters of character string constants is less than the reference value H are mixed, The inter-block determination section 415 performs the following processing. To be specific, the inter-block determination section 415 acquires the values of an execution probability that each execution path is executed, and of a probability that each function performs character string output processing. The execution probability can be calculated, for example, by providing a counter which counts the number of execution processing to the branch destination and the confluence source in the control flow, and then by preliminarily executing the output program 20. In addition, it is possible to determine whether or not a certain function executes a character string output instruction by monitoring whether or not the length of a buffer for outputting a character string is converted between before and after a function call. Furthermore, even without executing the output program 20, there is a conventionally known way to empirically acquire an execution probability from the structure of a control flow. Accordingly, since the technique for estimating an execution probability is conventionally known as a runtime trace collection technique and a profiling technique, descriptions thereof will be omitted.

An execution probability is acquired for each of a plurality of execution paths passing through a plurality of basic blocks in order in a group G' where each execution path in the group G is extended. Descriptions will be given of a method of setting this group G'. In order to acquire an execution probability, it is required to observe the number of execution for the plurality of execution paths that share the same entry and exit. Accordingly, the inter-block determination section 415 extends each execution path in the group G, so that all the execution paths mutually share the same entry and exit. Then, the inter-block determination section 415 sets a group of execution paths after extension as the group G'. Specifically, the inter-block determination section 415 sets the group G1 as a group G1' as it is. On the other hand, for the group G2, the execution path (6, 7) or the execution path (7) is extended to generate an execution path (6, 7, 8). When redundant execution paths are generated, the group G' includes only one of them, and the others are eliminated. In addition, a group G2' includes an infinite execution path where the number of loop iterations is increased, such as (6, 7, 8, 7, 8), (6, 7, 8, . . . , 7, 8). Moreover, the group G3' includes an execution path (10, 13, 15), an execution path (10, 13, 14, 15), an execution path (10, 11, 12, 13, 15), and an execution path (10, 11, 12, 13, 14, 15).

The inter-block determination section 415 estimates how much the performance is improved when each TT instruction in a path $P'_i$ ($1 \leq i \leq n$) in a certain extended group G' is replaced with any one of the first and second buffering instructions, compared with a case where all the TT instructions in the expanded group are replaced with the first buffering instructions. That is, the inter-block determination section 415 calculates the expected value of a processing time to be shortened, and the like. The expression used for the calculation is shown as Expression (1) below.

[Expression 1]

$$\sum_{i=1}^{n} e \cdot Q(p_i) \cdot (len(p_i) - H \cdot d(p_i))$$

Expression 1

In Expression 1, $Q(p'_i)$ represents a probability that the path $P'_i$ is executed. In addition, $len(p'_i)$ represents the total number of characters of character string constants to be outputted by the second buffering instructions in $p'_i$. Moreover, e represents a time required for converting the character code of one character of a character code set from the first code set to the second code set is represented. Furthermore, $d(p'_i)$ represents how many times conversion is performed in the execution path $p'_i$, that is, the number of successive sequences of the second buffering instructions sandwiched between the first buffering instructions.

When k TT instructions are included in the extended group G', there exist $2^k$ combinations in total since it is possible to replace each TT instruction with either one of the first and second buffering instruction. Accordingly, the inter-block determination section 415 calculates, for each of these combinations, the expected value of a processing time to be shortened, by using Expression 1. Then, the inter-block determination section 415 employs a combination providing the largest expected value, as a determination result to be outputted to the second replacement section 420.

It should be noted that the processing may not be completed for a practical time period when the number of the combinations is large since the number k of TT instructions is large. In this case, the inter-block determination section 415 may make an approximate determination on each TT instruction in accordance with the following steps:

1. Array the execution paths $p'_i$ in descending order of $Q(p'_i)$.
2. Select one execution path from the top. Advance the processing to Step 5 if there is no execution path to be selected.

3. Determine to replace each of the successive TT instructions, which is not determined, for outputting a character string constant where the total number of characters is not less than the reference value H, with the second buffering instruction.
4. Remove the selected execution paths and return the processing to Step 2.
5. Calculate the expected value of a processing time to be shortened, by using Expression (1), for each of all the combinations in which each undetermined TT instruction is replaced with either one of the first and second buffering instructions. Determine to replace each undetermined TT instruction with the first buffering instruction if the maximum expected value is a negative number.

Here, the description will be given by referring to FIG. 12, again. Lastly, the second replacement section 420 replaces, with the second buffering instruction, a character string output instruction whose character code set has been determined to be previously converted into the second code set (S1230). In the example of a JSP program, the second replacement section 420 replaces a part where an HTML tag such as <HTML> is written as it is with a call to a write(byte[]) method of the JSPWriter class of Java language.

Figure 18:
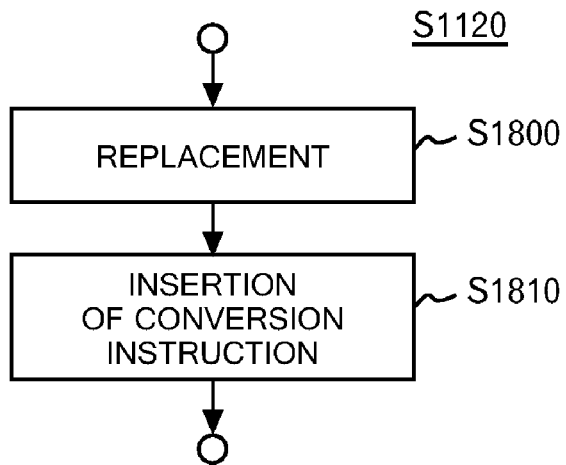
FIG. 18 shows a flowchart of processing in S1120.

FIG. 18 shows a flowchart of the processing in S1120. The first replacement section 500 replaces, with the first buffering instruction, each of a plurality of character string output instructions which have not been converted into the second buffering instructions (S1800). In the example of the JSP program, the first replacement section 500 replaces a tag such as <%=...> with a call of a write(char[]) method of the JSPWriter class of Java language. In addition, the first replacement section 500 replaces a part where the HTML tag such as <HTML> is written as it is, not with the second buffering instruction, but with the first buffering instruction, depending on the determination result of the determination section 410.

The instruction insertion section 510 inserts a conversion instruction into a part to be executed before the second buffering instruction of the output program 20, and also to be executed after the plurality of first buffering instructions (S1810). This processing step may be performed in combination with S1230 in the above JSP example. In other words, in the write(byte[]) method of the JSPWriter class, a conversion instruction is also inserted by replacing a character string output instruction with the write(byte[]) method since a character code set is converted before the second buffering processing.

It is advantageous to perform the conversion processing always in the write(byte[]) method in this manner. To be specific, firstly, the instruction insertion section 510 does not determine where a conversion instruction should be inserted in the output program 20. Accordingly, it is possible to shorten a processing time by the compiler 30. Moreover, since the conversion processing can be delayed until immediately before the first buffering instruction, it is possible to collectively convert as many character strings as possible, thereby reducing the number of the conversion processings.

On the other hand, it is conceivable that this kind of implementation is inefficient since unnecessary conversion processing is performed multiple times in a case where the write (byte[]) method is successively executed. However, this inconvenience can be solved as follows. When a write(byte[]) method is inline-expanded in the already-compiled program 60, a call of a flushCD( ) method which is a conversion instruction appears explicitly in the already-compiled program 60. If the plurality of calls of flushCD( ) are successively executed without including write(char[]) therebetween, the conversion processing after the second time onwards is useless since the first buffer is empty. Such a redundancy of the flushCD instruction can be eliminated by the Just-in-Time compiling section 700 by use of the partial redundancy elimination technique, which will be described later.

Instead of this, the instruction insertion section 510 may insert a conversion instruction explicitly into the already-compiled program 60 separately from the replacement of a character string output instruction with a write(byte[]) method. In this case, it is desirable that the instruction insertion section 510 insert the conversion instruction into a part to be executed immediately before each of the generated second buffering instructions. Thereby, similarly to the case where the conversion processing is performed in the write(byte[]) method, it is possible to accumulate as many character strings as possible, and then to collectively and efficiently convert them.

Figure 19:
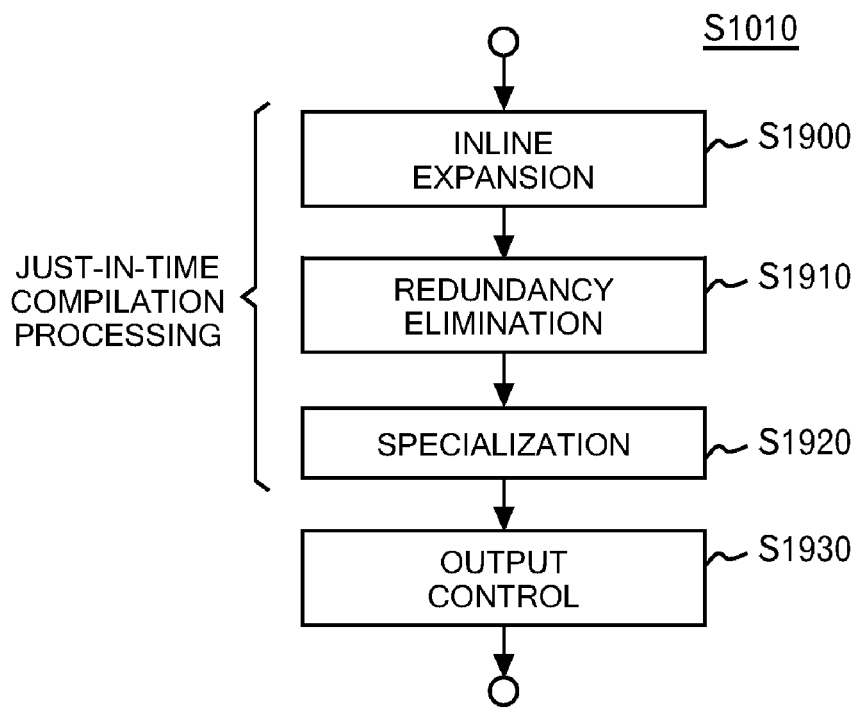
FIG. 19 shows a flowchart of processing in S1010.
Figure 20:
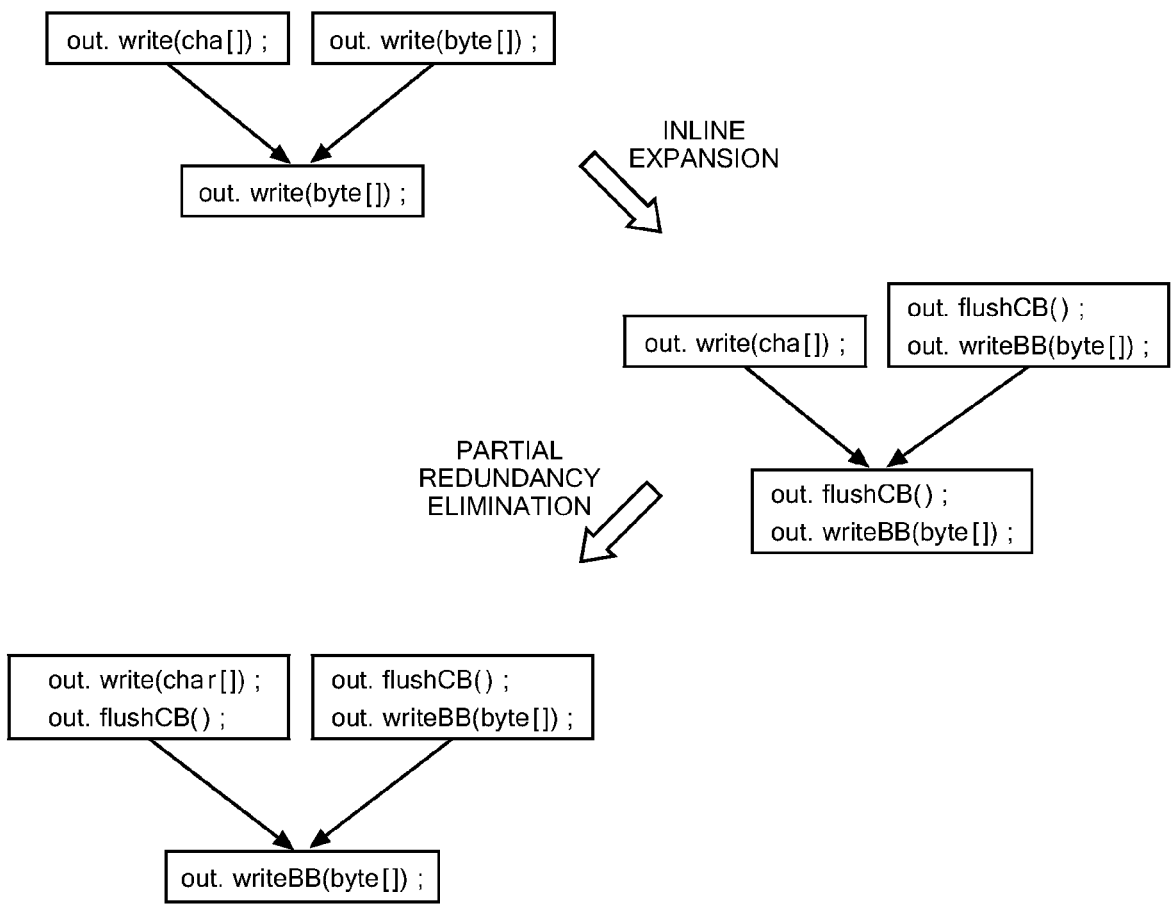
FIG. 20 shows an example of processing performed by a redundancy elimination section.

FIG. 19 shows a flowchart of the processing in S1010. The Just-in-Time compiling section 700 performs an inline expansion for a method (S1900). Next, the redundancy elimination section 706 eliminates conversion instructions except a conversion instruction to be executed first, from among a plurality of conversion instructions to be successively executed without including the first buffering instructions therebetween (S1910). Moreover, the redundancy elimination section 706 may eliminate a redundant conversion instruction by the partial redundancy elimination technique. With reference to FIG. 20, descriptions will be given of the technique for eliminating partial redundancy.

FIG. 20 shows an example of processing by the redundancy elimination section 706. The redundancy elimination section 706 detects a part where the plurality of execution paths, at least any one of which includes a conversion instruction, join one execution path as well as where the conversion instruction is included in the joined execution path, in the control flow of the already-compiled program 60. For example, a control flow on the left of FIG. 20 is changed to a control flow on the right of FIG. 20 as a result of the inline expansion. As a result, only an execution path on the right side includes a conversion instruction among the execution paths at the confluence source in the confluent part, and the execution path at the confluence destination also includes a conversion instruction.

The redundancy elimination section 706 eliminates a conversion instruction included in the joined execution path, and inserts a conversion instruction into each execution path which does not include a conversion instruction, among the plurality of execution paths to join. In other words, the redundancy elimination section 706 newly inserts a conversion instruction on the left side of the execution path at the confluence source as shown on the bottom left side of FIG. 20. Then, the redundancy elimination section 706 eliminates a conversion instruction included in the execution path at the confluence destination. As a result of this processing, the control flow becomes as shown on the bottom left side of FIG. 20. Accordingly, the redundancy of conversion processing performed when joining from the right execution path is eliminated.

Here, the description will be given by referring to FIG. 19, again. Next, the specialization controller 708 attempts to optimize conversion processing by specialization of an execution path (S1920). Descriptions will be given of an example of the optimization with reference to FIG. 21.

Figure 21:
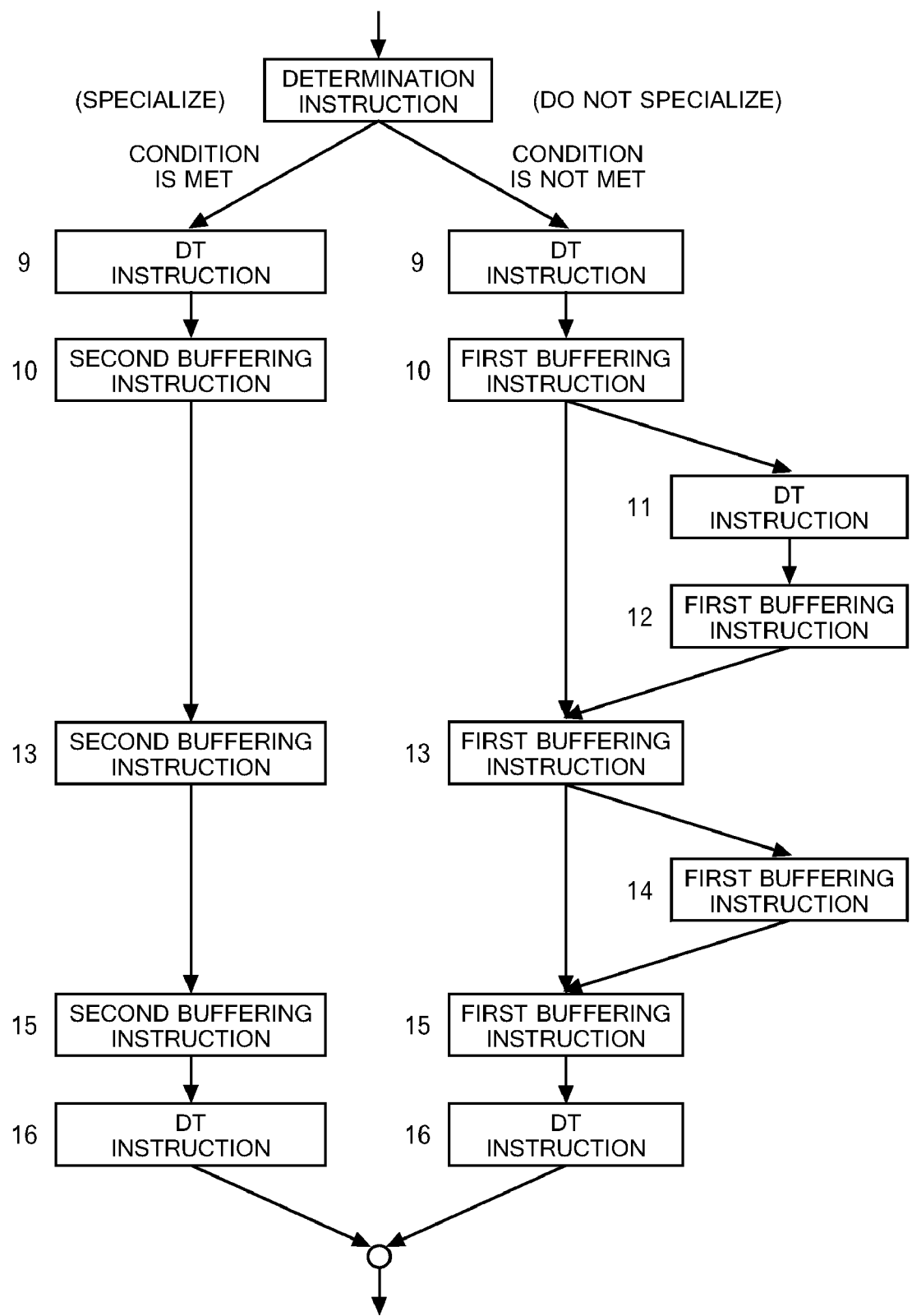
FIG. 21 shows an example of processing performed by a specialization controller.

FIG. 21 shows an example of processing by the specialization controller 708. The control flow shown in FIG. 21 shows a state after the control flow shown on the right side of FIG. 17 is optimized by specialization. It depends on the execution probability of each execution path, which of the first or second buffering instruction a character string output instruction (a TT instruction) for outputting a character string constant is replaced with. However, supposing a linear execution path (9, 10, 13, 15, 16) which does not branch is executed, only character string constants are successively outputted. For this reason, it is desirable that these character string constants be previously converted before execution, and that the character string output instructions be replaced with the second buffering instructions. Needless to say, taking into consideration a case where another execution path is executed, this kind of replacement does not necessarily maximize the efficiency.

In this case, it is effective to perform optimization in which a character string output instruction is replaced with a buffering instruction different between a case where the execution path (9, 10, 13, 15, 16) is executed and a case where the other execution paths are executed. In the example of FIG. 21, the specialization controller 708 firstly selects condition determination parts, that is, basic blocks 10 and 13, from the control flow to be optimized. Then, the specialization controller 708 generates an instruction for executing these condition determinations at one time in a part to be executed before these basic blocks (a part of a determination instruction).

Next, the specialization controller 708 generates an instruction sequence specialized for the execution path (9, 10, 13, 15, 16) in a part of a branch destination of the case where the execution path (9, 10, 13, 15, 16) is determined to be executed as a result of the condition determination. The specialized instruction sequence means a character string in which all the character string output instructions have been replaced respectively with the second buffering instructions. On the other hand, the specialization controller 708 generates an unspecialized instruction sequence in a part which is executed in a case where at least one of conditions for executing the execution path (9, 10, 13, 15, 16) is not met. The instruction sequence where all the character string output instructions are replaced respectively with the first buffering instructions is illustrated on the right of FIG. 21. However, any of the character string output instructions may be replaced with the second buffering instruction depending on the execution probability of the execution path.

Here, the description will be given by referring to FIG. 19, again. Next, the runtime section 70 executes the already-compiled program 60 after optimization (S1930). The output controller 710 adds a character string to the first buffer 712 in response to the execution of the first buffering instruction, as a part related to the processing of the embodiment. Moreover, the output controller 710 adds a character string to the second buffer 715 in response to the execution of the second buffering instruction. Furthermore, the output controller 710 fetches character strings from the first buffer 712 in response to the execution of a conversion instruction, and adds the character strings whose character code set has been collectively converted to the second buffer 715.

As described with reference to FIGS. 1 to 21, the information system 10 according to the embodiment converts the character code set for some of character string constants while the program is executed. Thereby, the information system 10 can reduce the number of conversion processings to be executed while reducing the number of characters whose character code set is converted during the execution of the program. Additionally, the determination whether or not each character string constant is previously converted is achieve by balancing, the effect that the number of characters to be converted can be reduced by conversion, with the effect that the number of conversion processings can be reduced by not performing some conversions, on the basis of the execution probability of each execution path. This makes it possible to improve the efficiency in processing of a program as a whole. Moreover, it is possible to further improve the efficiency in the processing of a program by combining optimization techniques, such as the inline expansion, the partial redundancy elimination and specialization.

Hereinafter, the specialization of the JSP program will be summarized.

FIG. 22 shows a part in the JSP program, which part corresponds to a character string output instruction and a specific example of the part. A character string output instruction for outputting a character string constant (a TT instruction) corresponds to the contents of a tag or a text written in HTML and the contents of a <jsp:text> tag in the JSP program. For example, the TT instruction corresponds to a part where an HTML tag such as a <title> tag is written as it is and its contents. In addition, the TT instruction also corresponds to the character string output instruction corresponds to a text written between start and end tags of the <jsp:text>.

A character string output instruction for outputting the value of a character string variable (a DT instruction) corresponds to an output instruction to an out object in an expression and a scriptlet in the JSP program. For example, the DT instruction corresponds to the right-hand side of =in a <% tag and a printin method call to an out object in the <% tag.

A function call which can output a character string corresponds to a call of a user-defined function reachable to the out object, a pagecontext object or a response object, in the JPS program. In addition, the function call corresponds to a call of a tag library. For example, the function call corresponds to a call of a user-defined function which is written in the <% tag, and which sets the PageContext object as an argument.

Furthermore, the first buffering instruction corresponds to the write(char[]) method of the JSPWriter class in the JSP program. The second buffering instruction corresponds to the write(byte[]) method of the JSPWriter class in the JSP program. These instructions do not exist in an original JSP program, but are generated by the information system 10 replacing a character string output instruction.

Next, descriptions will be given of a case where a PHP program as the output program 20 is optimized, specifically, of the difference between the case of the PHP program and the case of the JSP program, with reference to FIG. 23 to 26.

The processing on a multibyte character can be designated by a php.ini file that is a setting file, in the case of an implementation called Zend Engine which executes a PHP program. In the PHP program, a character code set for outputting during execution can be dynamically converted. Accordingly, a program, in which a character code set is or can be converted in this manner, is removed from the target for the optimization of the embodiment. A character code set for internal processing may be different from a character code set for output, depending on the setting of the php.ini file. In this case, it is possible to improve efficiency in processing by the information system 10 of the embodiment.

In other words, if descriptions will be given, replacing the processing with the operations of the information system 10, the information system 10 firstly reads out, from the php.ini file, the setting of a character code set for internal processing and the setting of a character code set for output. In a case where these character code sets are different from each other, the information system 10 determines that the character string output processing can be optimized. In the other cases, the information system 10 allows the existing Zend Engine to execute the program. Subsequently, the information system 10 scans a PHP program to determine whether or not an instruction for changing the setting of character code set for internal processing or the setting of character code set for output. If such an instruction is included, the information system 10 allows the existing Zend Engine to execute the program. If not included, the information system 10 performs processing for optimizing character string output processing.

Moreover, Zend Engine compiles a PHP program into an intermediate code to execute the program. Hence, the compiler 30 according to the embodiment plays a role as a compiler which compiles a PHP program into an intermediate code. This intermediate code corresponds to bytecode in Java language. Similar to the case of the example of JSP program, by introducing Alternative PHP cache, it is possible to reuse the result of compilation of a program at the first time for executing the same program again. Additionally, this intermediate code includes instructions of ZEND_ECHO and ZEND_PRINT, which are compiled from an echo statement and a print statement each of which is a character string output instruction. Accordingly, it suffices that the information system 10 targets instructions such as ZEND_ECHO and ZEND_PRINT for optimization.

However, this intermediate code is a binary code, which is different from bytecode of Java language. It is inconvenient to give descriptions by illustrating a binary code as it is. Accordingly, hereinafter, when descriptions are given of this intermediate code, the meanings of the binary codes on a program will be indicated. Firstly, the first and second buffering instructions in a PHP processing system will be described, with reference to FIGS. 23 and 24.

FIG. 23 shows a first implementation example of the first and second buffering instructions. A function from the fourth to sixth lines is one called from the intermediate code of the PHP program, and corresponds to the second buffering instruction. This function adds the character string of a second code set given as an argument to $byteBuffer that corresponds to the second buffer 715. On the other hand, a function from the first to third lines is one read out from the intermediate code of the PHP program, and corresponds to the first buffering instruction. This function converts the character string of the first code set given as an argument by calling a function of mb_convert_encoding, and provides the converted character string to the second buffering instruction.

The compiler 30 according to the embodiment may replace a character string output instruction for outputting a character string constant with the second buffering instruction shown in FIG. 23. Moreover, the compiler 30 may replace a character string output instruction for outputting the value of a character string variable with the first buffering instruction shown in FIG. 23. However, in this case, since a part of a plurality of character strings which can be collectively converted during the execution of a program is converted statically, the multiple times of conversions are required. The conversion of a character code set takes time in accordance with the number of times of conversion processings even if the number of characters is small. For this reason, the efficiency may be decreased. Accordingly, the compiler 30 according to the embodiment employs the following second implementation example.

FIG. 24 shows a second implementation example of the first and second buffering instructions. A function from the first to third lines corresponds to the first buffering instruction. This instruction adds a character string given as an argument to $charBuffer to be the first buffer 712. The fourth to seventh lines show a method write_b. This method plays both roles of the conversion instruction and the second buffering instruction. The fifth line is a conversion instruction, and an entity of the conversion instruction is defined by the 11th to 16th lines. The 12th line is an instruction for checking whether or not the first buffer 712 is empty, and instructions respectively in the 13th and 14th lines are executed if the first buffer 712 is not empty. The instruction in the 13th line converts the character code set of a character string stored in the first buffer 712 into the second code set, and then adds the converted code set to the second buffer 715. The instruction in the 14th line for empties the first buffer 712. The sixth line is the second buffering instruction, and an entity of the second buffering instruction is defined by eighth to tenth lines. Specifically, a character string given as an argument is added to the second buffer 715 in the ninth line.

The information system 10 according to the embodiment employs such an implementation for the first and second buffering instructions as described above. Thereby, the information system 10 can collectively convert a character code set after accumulating the character strings before converting the character code set in the first buffer 712. As a result, the information system 10 can improve the efficiency of processing by decreasing the number of times of conversion processing.

It should be noted that, in the PHP program, a character string before conversion is not necessarily a char type and that a character string after conversion is not necessarily a byte type. In the embodiment, in order to facilitate understanding by associating with the JSP program, the first code set for internal processing before conversion is the char type in the embodiment, and a buffer to store a character string of this type is shown by a variable $charBuffer. Similarly, the second code set for output after conversion is set to be the byte type, and a buffer to store a character string of this type is shown by a variable $byteBuffer. Hence, in the embodiment, it is sufficient if the character code sets before and after conversion are different so that a specific character code set thereof does not matter.

FIG. 25 shows a part in the PHP program, which part corresponds to a character string output instruction and a specific example of the part. A character string output instruction for outputting a character string constant (a TT instruction) corresponds to a tag and a text, which are written as HTML, in the PHP program. In addition, the TT instruction corresponds to an echo statement or a print expression in the PHP program. Specifically, a part where an HTML tag such as a <title> tag is written as it is, and a part written in a <?php echo tag and the like become character string output instructions.

A character string output instruction for outputting the value of a character string variable (a DT instruction) corresponds to an echo statement or a Pprint expression, which takes a variable as an argument, in the PHP program. For example, when a variable name beginning with $ is given by the <?php echo tag, the tag corresponds to the DT instruction.

A function call which can output a character string corresponds to all the function calls in the PHP program. Moreover, the second buffering instruction corresponds to a ZEND_ECHO_WITHOUT_ENC instruction for calling the above-mentioned function write_b from an intermediate code, in the intermediate codes of the PHP program. This instruction is one which is accorded with the format of the intermediate code, and the entity (function/action) of the instruction is the same as the write_b function. Moreover, the first buffering instruction corresponds to a ZEND_ECHO_WITH_ENC instruction for calling the above-mentioned write_c from an intermediate code, in the intermediate codes of the PHP program. Similarly, the entity of this instruction is the same as write_c.

FIG. 26a shows a first generation example of a control flow graph in the PHP program. It is possible in the JSP program to generate the control flow graph of the JSP program by applying an existing analyzer to a Java program after compiling the JSP program into the Java program once. Since there is no such an analyzer for the PHP program, it is not possible to employ the same method. For this reason, after scanning the PHP program, the flow graph generator 400 generates a control flow graph by analyzing the control structure of the PHP program. With reference to FIGS. 26a and 26b, descriptions will be given of a processing example of generating a control flow graph from an instruction for control, which the flow graph generator 400 has detected from the PHP program.

When detecting an IF statement, the flow graph generator 400 generates a basic block showing the if clause and a basic block showing processing at the time when this condition is met. Then, the basic block showing the if clause is connected to the basic block showing the processing at the time when this condition is met by an edge showing the flow of control at the time when this condition is met. An unconnected incoming edge is connected to a basic block executed immediately before the IF statement. An unconnected outgoing edge is connected to a basic block executed immediately after the IF statement. Descriptions will hereinafter be omitted of the connection of the unconnected edges since they are the same as in all the processings afterwards.

When detecting an IF statement accompanied by an Else clause, the flow graph generator 400 generates a basic block showing the if clause and a basic block showing processing at the time when a condition is met. Then, the basic block showing the if clause is connected to the basic block showing the processing at the time when the condition is met by an edge showing the flow of control at the time when the condition is met. In addition, the basic block showing the if clause is connected to the basic block showing the processing at the time when the condition is not established by an edge showing the flow of control at the time when the condition is not established. It should be noted that the control flow of an ElseIF statement is generated by a combination of the processing at the time when an IF statement is detected and the processing at the time when an IF statement accompanied by an Else clause.

When detecting a DO-while statement, the flow graph generator 400 generates a basic block showing processing at the time when a condition is met and a basic block showing an IF clause. Then, the basic block showing the processing at the time when the condition is met is connected to the basic block showing the IF clause by an edge showing a control flow for advancing the control to the next instruction. Moreover, the basic block showing the IF clause is connected to the basic block showing the processing upon establishing the condition by the line showing the flow of control upon establishing the condition.

When detecting a For statement, the flow graph generator 400 generates a basic block showing initialization processing, a basic block showing an if clause, a basic block showing post-processing, and a basic block showing processing upon establishing a condition. Then, the basic block showing the initialization processing is connected to the basic block showing the if clause by an edge showing a control flow for advancing the control to the next instruction. In addition, the basic block showing the if clause is connected to the basic block showing the processing upon establishing the condition by a line showing the flow of control upon establishing the condition. Moreover, the basic block showing the processing upon establishing the condition is connected to the basic block showing the post-processing by an edge showing the flow of control for advancing the control to the next instruction. Furthermore, the basic block showing the post-processing is connected to the basic block showing the if clause by an edge showing the flow of control for advancing the control to the next instruction.

FIG. 26b shows a second generation example of the control flow graph in the PHP program. When detecting a Foreach statement, the flow graph generator 400 generates a basic block showing initialization processing, a basic block showing an if clause, and a basic block showing processing at the time when a condition is met. Then, the basic block showing the initialization processing is connected to a control flow showing the if clause by an edge showing a control flow for advancing the control to the next instruction. Moreover, the basic block showing the if clause is connected to the basic block showing the processing at the time when the condition is met by an edge showing the flow of control at the time when the condition is met. Furthermore, the basic block showing the processing at the time when the condition is met is connected to the basic block showing the if clause by the control flow for advancing the control to the next instruction.

When detecting a break statement, the flow graph generator 400 generates an edge for connecting the detected basic block to a basic block showing processing at the time when a loop is terminated. When the break statement has the parameter of an option, a loop to be a connection destination is selected from among a plurality of loops which is nested in accordance with the value of the parameter. When detecting a continue statement, the flow graph generator 400 connects the detected basic block to a basic block at the starting position of a loop. When the continue statement has the parameter of an option, a loop to be a connection destination is selected from among a plurality of loops which is nested in accordance with the value of the parameter, as in the case of the break statement.

When detecting a switch statement, the flow graph generator 400 generates a basic block for evaluating an expression, and a plurality of basic blocks for performing various processings depending on the respective evaluation values. Then, the flow graph generator 400 connects, by edges each showing the control at the time when the evaluation value of the expression is a corresponding one of a plurality of predetermined values, the basic block for evaluating the expression to the corresponding basic blocks. When detecting a return statement, the flow graph generator 400 generates an edge which extends from the detected basic block to the end point of a function/method to which the basic block belongs.

The descriptions have been given of the examples of processing for optimizing the PHP program by focusing the differences from the examples of processing for optimizing the JSP program. Consequently, the compiler 30 can improve efficiency in character string output processing not only in the JSP program, but also in the PHP program. In addition, it is the same for a program written in another programming language. As long as it is a language processing system where a compiling section and a runtime section are separated from each other, it is possible to achieve the determination on whether or not a character string constant is previously converted, the processing of adding a character string to the first and second buffers, and the processing of converting a character code set, by performing the processing illustrated in the embodiment.

Figure 27:
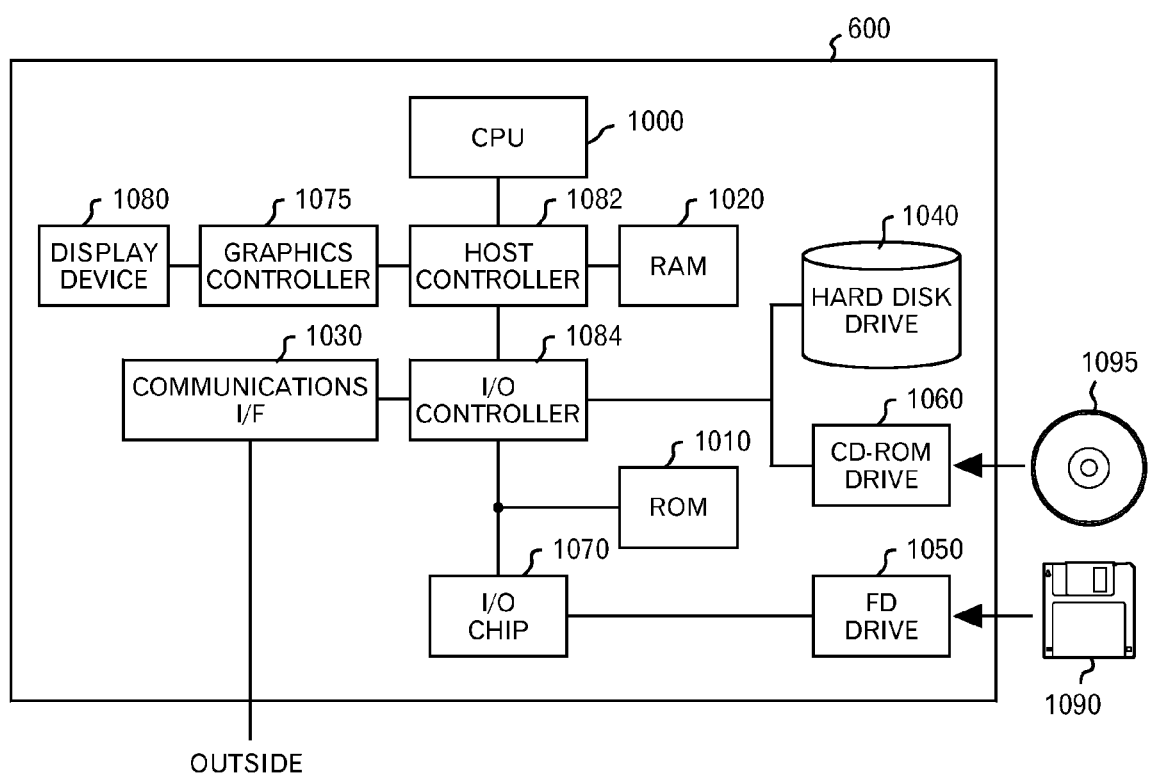
FIG. 27 shows an example of a hardware configuration of an information processing device 600 which functions as the information system.

FIG. 27 shows an example of a hardware configuration of an information processing device 600 which functions as the information system 10. The information processing device 600 includes a CPU peripheral section, an I/O section and a legacy I/O section. The CPU peripheral section includes a CPU 1000, a RAM 1020 and a graphic controller 1075, all of which are connected one to another by a host controller 1082. The I/O section includes: a communications interface 1030, a hard disk drive 1040 and a CD-ROM drive 1060, each of which is connected to the host controller 1082 by an I/O controller 1084. The legacy I/O section includes a ROM 1010, a flexible disk drive 1050 and an I/O chip 1070, each of which is connected to the I/O controller 1084.

The host controller 1082 connects the RAM 1020 to the CPU 1000 and the graphic controller 1075, which can access the RAM 1020 at a high transmission rate. The CPU 1000 operates and controls each section, on the basis of the programs stored in the ROM 1010 and the RAM 1020, for example, on the basis of the optimization program according to the present invention. The graphic controller 1075 acquires image data, which are generated in a frame buffer provided in the RAM 1020 by the CPU 1000 or the like. The graphic controller 1075 then displays the image data on a display device 1080. Alternatively, the graphic controller 1075 may include a frame buffer therein, for storing image data generated by the CPU 1000 or the like.

The I/O controller 1084 connects the host controller 1082 to each of the communications interface 1030, the hard disk drive 1040 and the CD-ROM drive 1060, which are I/O devices transmitting data at relatively higher rates. The communications interface 1030 communicates with external devices via a network. The hard disk drive 1040 stores an optimization program, the output program 20 and data, all of which are used by the information processing device 600. The CD-ROM drive 1060 reads a program or data from a CD-ROM 1095, and then provides the program or the data to the RAM 1020 or the hard disk drive 1040.

In addition, the ROM 1010 and I/O devices such as the flexible disk drive 1050 and the I/O chip 1070, which I/O devices transmits data at a relatively lower rate, are connected to the I/O controller 1084. The ROM 1010 stores a boot program, which is executed by the CPU 1000 executes when the information processing device 600 is booted, and a program depending on the hardware of the information processing device 600, and the like. The flexible disk drive 1050 reads a program or data from a flexible disk 1090, and then provides the program or the data to the RAM 1020 or the hard disk drive 1040 via the I/O chip 1070. The flexible disk 1090 and various I/O devices are connected to the I/O chip 1070 via a parallel port, a serial port, a keyboard port, a mouse port and the like.

A program, which is provided to the information processing device 600 by a user, is stored in a recording medium such as the flexible disk 1090, the CD-ROM 1095, or an IC card. The program is read from the recording medium via the I/O chip 1070 and/or the I/O controller 1084. Thereafter, the program is installed in the information processing device 600, and then is executed. The optimization program causes the information processing device 600 to perform the same operations as those of the information system 10 described with reference to FIGS. 1 to 26B. For this reason, descriptions will be omitted of the operations of the information processing device 600.

The program described above may be stored in an external recording medium. As such a recording medium, in addition to the flexible disk 1090 and the CD-ROM 1095, it is possible to use: an optical recording medium such as a DVD or a PD; a magneto-optical recording medium such as an MD, a tape medium; a semiconductor memory such as an IC card; or the like. In addition, it is possible to use, as a recording medium, a storage device such as a hard disk or a RAM, which is provided to a server system connected to a dedicated communications network or the Internet. By using such a recording device, a program may be provided to the information processing device 600 via the network.

The descriptions have been given by using the embodiment of the present invention. However, the technical scope of the present invention is not limited to the scope described in the above embodiment. It is obvious to those skilled in the art that various modifications or improvements can be made on the above embodiment. For example, before the output program is executed, the static converter 310 may previously convert a character code set of a character string constant, and may concurrently replace a character string output instruction for outputting a character string constant with the second buffering instruction to be added to the second buffer 715 while associating a converted character string with information indicating the output order of the character strings. In addition, the dynamic converter 320 may add a character string output instruction for outputting the value of a character string variable to the first buffer 712 without converting the character code set from the first code set, while associating the character string output instruction with information indicating the output order of character strings. Then, after collectively converting a plurality of character strings stored in the first buffer 712, the dynamic converter 320 may sort and arrange the character strings after the conversion and character strings in the second buffer 715 in the output order. Then, the dynamic converter 320 may insert, as a conversion instruction, an instruction for further causing the second buffer 715 to further store character strings. This also makes it possible to collectively convert the values of two or more character string variables which are not successively outputted, and to thereby improve efficiency in processing by reducing the number of conversion processings. It is obvious from the descriptions in the scope of claims that embodiments to which such an alteration or improvement is added can be also included in the technical scope of the present invention.

What is claimed is:

1. A method of optimizing character string output processing, comprising:

acquiring an output program for sequentially executing a plurality of character string output instructions, and for outputting a text in which a plurality of output character strings are combined;

converting the character code set of the character string constants, which is outputted by at least one of the character string output instructions, from a first code set for internal processing to a second code set for output, before the output program is executed;

determining, for each character string output instruction for outputting a character string constant, whether or not a character code set of a character string to be outputted has been previously converted into the second code set before the output program is executed;

buffering the values of two or more character string variables to be outputted by two or more of the character string output instructions without converting the character code set from the first code set, during the execution of the output program;

converting collectively the character code set of the values of the two or more buffered character string variables, from the first code set to the second code set; and outputting the character string constant whose character code set has been converted, and the values of the two or more character string variables whose character code set has been converted, as at least a part of the text.

2. A system for optimizing character string output processing, comprising:
   at least one computing device comprising:
      an acquiring section for acquiring an output program, which sequentially executes a plurality of character string output instructions, and which outputs a text in which a plurality of output character strings are combined;
      a static converter for converting a character code set of a character string constant of at least one of the character string output instructions, each for outputting a character string constant, from a first code set for internal processing to a second code set for output, before execution of the output program;
      a determination section for determining, for each character string output instruction for outputting a character string constant, whether or not a character code set of a character string to be outputted has been previously converted into the second code set before the output program is executed;
      a first buffer for buffering values of two or more character string variables to be outputted respectively by two or more of the character string output instructions, without converting the character code set from the first code set, during the execution of the output program;
      a dynamic converter for collectively converting the values of the two or more character string variables which have been buffered by the first buffer, from the first code set to the second code set; and
      an output controller for allowing a character string constant, whose character code set has been converted by the static converter, and the values of the two or more character string variables, whose character code set has been converted by the dynamic converter, to be outputted as at least a part of the text.

3. The system according to claim 2, further comprising:
   a second buffer for temporarily storing a character string constant and a value of a character string variable, whose character code set has been converted into the second code set, to allow the output controller to output the character string constant and the value of the character string variable.

4. The system according to claim 3, wherein the static converter further comprises:
   a second replacement section for replacing a character string output instruction whose character code set has been previously converted into the second code set, with a second buffering instruction for adding, to the second buffer, a character string whose character code set has previously been converted into the second code set.

5. The system according to claim 4, wherein the dynamic converter further comprises:
   a first replacement section for replacing each of a plurality of character string output instructions which have not been converted into the second buffering instructions, with a first buffering instruction for adding a character string, which is to be outputted, to the first buffer, without converting the character code set from the first code set; and
   an instruction insertion section for inserting a conversion instruction into a part of the output program executed before the second buffering instruction and after the plurality of first buffering instructions, the conversion instruction collectively converting a character code set of a plurality of character strings stored in the first buffer into the second code set, and then adding the converted character strings to the second buffer.

6. The system according to claim 5, wherein the determination section determines, for each character string output instruction for outputting a character string constant, whether or not to previously convert the character code set of the character string constant, on the basis of a number of characters of a character string to be outputted.

7. The system according to claim 6, wherein, for at least one of the character string output instructions for outputting a character string constant, the determination section determines to previously convert the character code set of a character string to be outputted, on condition that the at least one of the character string output instructions is successively executed without including other character string output instructions, and on condition that a total number of characters to be outputted is not less than a predetermined reference value.

8. The system according to claim 6, wherein the determination section determines not to previously convert the character code set of a character string to be outputted before executing the output program, on condition that at least one of character string output instructions to be successively executed, whose total number of characters of a character string constant to be outputted is less than a predetermined reference value, is successively executed after another character string output instruction for outputting the value of a character string variable, and is successively executed before still another character string output instruction for outputting the value of a character string variable.

9. The system according to claim 2, wherein the acquiring section acquires an output program for outputting a tagged document as an output character string, and then removes a blank between an end tag and a following start tag, and a comment part which does not influence a display of the tagged document, from a character string designated to be outputted in the acquired output program.

10. The system according to claim 5, wherein
    the static converter further includes a flow graph generator, which selects, from the acquired output program, a character string output instruction and a function call enabling the character string output instruction to be executed, and which then generates a control flow graph of the selected character string output instruction and function call; and
    the determination section determines, for each character string output instruction for outputting a character string constant, whether or not to previously convert a character string to be outputted into the second code set before executing the output program, on the basis of the control flow graph.

11. The system according to claim 10, wherein the determination section further comprises:
    an intra-block determination section for determining whether or not to previously convert a character code set before executing the output program on the basis of a total number of characters of character strings to be outputted, for a plurality of character string output instructions which are successively executed in each basic block in the control flow graph; and
    an inter-block determination section for determining whether or not to previously convert a character code set before executing the output program further on the basis of a number of characters to be outputted by a character string output instruction included in another basic block, for a character string output instruction, which is a set of character string output instructions, whose total number of characters of a character string to be outputted is smaller than a predetermined reference value, and which is executed at a beginning or an end of a basic block.

12. The system according to claim 11, wherein, for a block group having at least one basic block including a character string output instruction whose character code set the intra-block determination section does not determine whether or not to previously convert, the inter-block determination section determines whether or not to previously convert a character string to be outputted in each basic block in the block group, on the basis of an execution probability of each of a plurality of execution paths which sequentially pass through a plurality of basic blocks in the block group, and also on the basis of an estimation of performance improvement resulting from previous conversion of the character string to be outputted in each execution path.

13. The system according to claim 11, further comprising:
a specialization controller which generates two instruction sequences, and then causes any one of the two instruction sequences to be selectively executed for each execution path including a character string output instruction whose character string the determination section determines not to output, on condition that the total number of characters of character strings to be successively outputted exceeds the reference value when supposing that there is no branch or confluence to another execution path, one of the two instruction sequences allowing the execution path to be executed after previously converting the character strings to be outputted, and the other one of the two instruction sequences allowing another execution path to be executed without previously converting the character strings to be outputted.

14. The system according to claim 5, further comprising a redundancy elimination section, wherein
the instruction insertion section inserts the conversion instruction into a part to be executed immediately before each of the second buffering instructions which have been generated by replacing the character string output instructions; and
the redundancy elimination section eliminates conversion instructions except one to be executed first among the plurality of conversion instructions which are successively executed without including the first buffering instruction.

15. The system according to claim 12, wherein, in a case where a plurality of execution paths, at least one of which includes the conversion instruction, join into one execution path, the redundancy elimination section eliminates the conversion instruction included in the joined execution path, and inserts the conversion instruction into another one of the confluent execution paths, which does not include the conversion instruction, on condition that the joined execution path includes the conversion instruction.

16. An optimization program product stored on a non-transitory computer readable medium, which when executed, causes an information processing device to function as a system for optimizing character string output processing, the program product comprising program code for:
acquiring an output program, which sequentially executes a plurality of character string output instructions, and which thereby outputs a text in which a plurality of character string output instructions are combined;
converting a character code set of the character string constant of at least one of the character string output instructions each for outputting a character string constant, from a first code set for internal processing to the second code set for output, before execution of the output program;
determining, for each character string output instruction for outputting a character string constant, whether or not a character code set of a character string to be outputted has been previously converted into the second code set before the output program is executed;
buffering the values of two or more character string variables to be outputted respectively by two or more of the character string output instructions without converting the character code set from the first code set, during the execution of the output program;
collectively converting the character code set of the values of the two or more character string variables which have been buffered by the first buffer, from the first code set to the second code set; and
allowing the character string constant whose character code set has been converted by the static converter and the values of the two or more character string variables whose character code set has been converted by the dynamic converter to be outputted as at least a part of the text.

* * * * *